US011847391B2

(12) United States Patent
Gopalakrishnan et al.

(10) Patent No.: US 11,847,391 B2
(45) Date of Patent: Dec. 19, 2023

(54) COMPUTER SYSTEM FOR SIMULATING PHYSICAL PROCESSES USING SURFACE ALGORITHM

(71) Applicant: Dassault Systemes Simulia Corp., Johnston, RI (US)

(72) Inventors: Pradeep Gopalakrishnan, Woburn, MA (US); Raoyang Zhang, Burlington, MA (US); Hudong Chen, Newton, MA (US); Junye Wang, Johnston, RI (US); Avinash Jammalamadaka, Johnston, RI (US)

(73) Assignee: Dassault Systemes Simulia Corp., Johnston, RI (US)

( * ) Notice: Subject to any disclaimer, the term of this patent is extended or adjusted under 35 U.S.C. 154(b) by 505 days.

(21) Appl. No.: 16/914,730

(22) Filed: Jun. 29, 2020

(65) Prior Publication Data
US 2021/0406434 A1 Dec. 30, 2021

(51) Int. Cl.
*G06F 30/28* (2020.01)
*G06F 7/485* (2006.01)
(Continued)

(52) U.S. Cl.
CPC .............. *G06F 30/28* (2020.01); *G06F 7/485* (2013.01); *G06N 7/08* (2013.01); *G06F 2113/08* (2020.01)

(58) Field of Classification Search
CPC ...... G06F 30/28; G06F 7/485; G06F 2113/08; G06F 2111/10; G06F 30/25; G06F 2119/14; G06N 7/08
See application file for complete search history.

(56) References Cited

U.S. PATENT DOCUMENTS

| 3,818,757 A | 6/1974 | Brown |
| 4,498,134 A | 2/1985 | Hansen et al. |

(Continued)

FOREIGN PATENT DOCUMENTS

| CN | 101556687 | 10/2009 |
| CN | 102174888 | 9/2011 |

(Continued)

OTHER PUBLICATIONS

Morgan, et al., "A Parametric Investigation of Oblique Shockwave/ Turbulent Boundary Layer Interaction Using LES," 41st AIAA Fluid Dynamics Conference and Exhibit, pp. 1-19 (Year: 2011).*

(Continued)

*Primary Examiner* — Steven W Crabb
(74) *Attorney, Agent, or Firm* — Fish & Richardson P.C.

(57) ABSTRACT

Described are computer implemented techniques for simulating elements of a fluid flow. These techniques include storing in a memory state vectors for a plurality of voxels, the state vectors comprising a plurality of entries that correspond to particular momentum states of a plurality of possible momentum states at a voxel, storing in a memory a representation of at least one surface that is sized and oriented independently of the size and orientation of the voxels, perform interaction operations on the state vectors, the interaction operations modelling interactions between elements of different momentum states, perform surface interaction operations on the representation of the surface, the surface interaction operations modelling interactions between the surface and substantially all elements of voxels, and performing move operations on the state vectors to reflect movement of elements to new voxels.

24 Claims, 9 Drawing Sheets

(51) Int. Cl.
  *G06N 7/08* (2006.01)
  *G06F 113/08* (2020.01)

(56) References Cited

U.S. PATENT DOCUMENTS

| | | | |
|---|---|---|---|
| 4,507,726 | A | 3/1985 | Grinberg et al. |
| 4,729,098 | A | 3/1988 | Cline et al. |
| 4,809,202 | A | 2/1989 | Wolfram |
| 4,831,519 | A | 5/1989 | Morton |
| 4,860,245 | A | 8/1989 | Kinoshita |
| 4,933,895 | A | 6/1990 | Grinberg et al. |
| 4,969,116 | A | 11/1990 | Wada et al. |
| 4,989,166 | A | 1/1991 | Akasaka et al. |
| 5,038,302 | A | 8/1991 | Kaufman |
| 5,069,065 | A | 12/1991 | Sprunt et al. |
| 5,159,690 | A | 10/1992 | Margolus |
| 5,255,212 | A | 10/1993 | Kondoh et al. |
| 5,361,385 | A | 11/1994 | Bakalash |
| 5,377,129 | A | 12/1994 | Molvig et al. |
| 5,408,638 | A | 4/1995 | Sagawa et al. |
| 5,416,729 | A | 5/1995 | Leon et al. |
| 5,424,963 | A | 6/1995 | Turner et al. |
| 5,432,718 | A | 7/1995 | Molvig et al. |
| 5,442,733 | A | 8/1995 | Kaufman et al. |
| 5,548,694 | A | 8/1996 | Frisken Gibson |
| 5,594,671 | A | 1/1997 | Chen et al. |
| 5,605,517 | A | 2/1997 | Sherman |
| 5,606,517 | A | 2/1997 | Traub et al. |
| 5,640,335 | A | 6/1997 | Molvig et al. |
| 5,848,260 | A | 12/1998 | Chen et al. |
| 5,953,239 | A | 9/1999 | Teixeira et al. |
| 6,318,156 | B1 | 11/2001 | Dutton et al. |
| 6,516,080 | B1 | 2/2003 | Nur |
| 6,915,245 | B1 | 7/2005 | Hinton et al. |
| 6,928,399 | B1 | 8/2005 | Watts et al. |
| 7,209,873 | B1 | 4/2007 | Kliegel |
| 7,590,514 | B1 | 9/2009 | Olovsson |
| 8,583,411 | B2 | 11/2013 | Fung |
| 8,757,871 | B2 | 6/2014 | Gruebele et al. |
| 9,058,446 | B2 | 6/2015 | Lu et al. |
| 9,228,873 | B2 | 1/2016 | Crouse et al. |
| 9,507,047 | B1 | 11/2016 | Dvorkin et al. |
| 10,101,188 | B2 | 10/2018 | Crouse et al. |
| 10,550,690 | B2 | 2/2020 | Crouse et al. |
| 10,762,252 | B2 | 9/2020 | Gopalakrishnan et al. |
| 11,118,449 | B2 | 9/2021 | Crouse et al. |
| 11,651,125 | B2 | 5/2023 | Crouse et al. |
| 11,714,040 | B2 | 8/2023 | Crouse et al. |
| 2002/0173915 | A1 | 11/2002 | Egermann et al. |
| 2005/0182603 | A1 | 8/2005 | Freitas et al. |
| 2006/0132131 | A1 | 6/2006 | Fleury et al. |
| 2006/0277012 | A1 | 12/2006 | Ricard et al. |
| 2007/0016389 | A1 | 1/2007 | Ozgen |
| 2007/0112518 | A1 | 5/2007 | Montaron |
| 2007/0276639 | A1 | 11/2007 | Montaron et al. |
| 2008/0012853 | A1 | 1/2008 | Geiger |
| 2008/0044543 | A1 | 2/2008 | McClements et al. |
| 2009/0070085 | A1 | 3/2009 | Gullapalli et al. |
| 2010/0030534 | A1 | 2/2010 | Reich et al. |
| 2010/0128932 | A1 | 5/2010 | Dvorkin et al. |
| 2010/0156901 | A1 | 6/2010 | Park et al. |
| 2010/0274543 | A1 | 10/2010 | Walker |
| 2010/0312535 | A1 | 12/2010 | Chen et al. |
| 2011/0184711 | A1 | 7/2011 | Altman et al. |
| 2011/0313744 | A1 | 12/2011 | Oury et al. |
| 2012/0130639 | A1 | 5/2012 | Hanson et al. |
| 2012/0136578 | A1 | 5/2012 | Ghedan et al. |
| 2012/0179436 | A1 | 7/2012 | Fung |
| 2012/0191432 | A1 | 7/2012 | Khataniar et al. |
| 2012/0241149 | A1 | 9/2012 | Chen et al. |
| 2012/0310614 | A1 | 12/2012 | Beattie et al. |
| 2013/0018641 | A1 | 1/2013 | Prisco et al. |
| 2013/0080128 | A1 | 3/2013 | Yang et al. |
| 2013/0116997 | A1 | 5/2013 | Sun et al. |
| 2013/0151221 | A1 | 6/2013 | Chen et al. |
| 2013/0317791 | A1 | 11/2013 | Danielson |
| 2014/0019053 | A1 | 1/2014 | de Prisco |
| 2014/0067347 | A1 | 3/2014 | Gurpinar et al. |
| 2014/0343858 | A1 | 11/2014 | Crouse et al. |
| 2015/0048007 | A1 | 2/2015 | Weerasooriya et al. |
| 2015/0051892 | A1 | 2/2015 | Carvajal et al. |
| 2015/0059447 | A1 | 3/2015 | Rickards |
| 2015/0066463 | A1 | 3/2015 | Shetty et al. |
| 2015/0141303 | A1 | 5/2015 | Harwell et al. |
| 2015/0142407 | A1 | 5/2015 | Wakefield et al. |
| 2015/0149139 | A1 | 5/2015 | Chavez et al. |
| 2015/0268080 | A1 | 9/2015 | Crouse et al. |
| 2016/0003010 | A1 | 1/2016 | Fornel et al. |
| 2016/0188768 | A1 | 6/2016 | Gopalakrishnan et al. |
| 2016/0209256 | A1 | 7/2016 | Crouse et al. |
| 2016/0307359 | A1 | 10/2016 | Desbrun et al. |
| 2017/0074770 | A1 | 3/2017 | Fourno |
| 2017/0198573 | A1 | 7/2017 | Kim et al. |
| 2018/0329112 | A1 | 1/2018 | Lee et al. |
| 2018/0120213 | A1 | 5/2018 | Dyshlyuk et al. |
| 2018/0253514 | A1 | 9/2018 | Bryant et al. |
| 2019/0025461 | A1 | 1/2019 | Wiener |
| 2019/0050508 | A1 | 2/2019 | Crouse et al. |
| 2019/0086250 | A1 | 3/2019 | Crouse et al. |
| 2019/0154597 | A1 | 5/2019 | Zhang |
| 2019/0186255 | A1 | 6/2019 | Mustapha |
| 2019/0203593 | A1 | 7/2019 | Fullmer et al. |
| 2019/0212241 | A1 | 7/2019 | Crouse et al. |
| 2019/0368344 | A1 | 12/2019 | Crouse et al. |
| 2020/0063532 | A1 | 2/2020 | Crouse et al. |
| 2021/0062638 | A1 | 3/2021 | Crouse et al. |
| 2022/0207219 | A1 | 6/2022 | Otomo et al. |
| 2022/0414295 | A1 | 12/2022 | Crouse et al. |
| 2023/0077778 | A1 | 3/2023 | Crouse et al. |

FOREIGN PATENT DOCUMENTS

| | | |
|---|---|---|
| CN | 102245289 | 11/2011 |
| CN | 102472649 | 5/2012 |
| CN | 103698102 | 4/2014 |
| CN | 104067290 | 9/2014 |
| CN | 104334828 | 2/2015 |
| CN | 102383783 | 6/2015 |
| CN | 105393110 | 3/2016 |
| CN | 105580019 | 5/2016 |
| CN | 105910996 | 8/2016 |
| CN | 106233146 | 12/2016 |
| EP | 0228915 | 7/1987 |
| GB | 2066466 | 7/1981 |
| JP | 2011191848 | 9/2011 |
| JP | 2011525271 | 9/2011 |
| JP | 2016524222 | 8/2016 |
| WO | WO 1991017204 | 11/1991 |
| WO | WO 1992001993 | 2/1992 |
| WO | WO 1999034308 | 7/1999 |
| WO | WO 2008021652 | 2/2008 |
| WO | WO 2012071090 | 5/2012 |
| WO | WO 2016159807 | 10/2016 |
| WO | WO 2019097272 | 5/2019 |

OTHER PUBLICATIONS

U.S. Appl. No. 07/555,754, Molvig, filed Jul. 12, 1990.
U.S. Appl. No. 07/812,881, Molvig, filed Dec. 20, 1991.
Bao et al., "Lattice Boltzmann method for fluid simulations," Department of Mathematics, Courant Institute of Mathematical Sciences, New York University, Apr. 14, 2011, 44:1-16.
Bryant et al., "Prediction of relative permeability in simple porous media" Physical Review A vol. 46, No. 4 Aug. 15, 1992) (Year: 1992).
Burges et al., "Buoyant Mixtures of Cellular Automation Gases," Complex Systems, 1:31-50 (1987).
Catala, et al. "Fluid Flow Fundamentals." Oilfield Review, Dec. 31, 1996, 61-64.
Chatterjee et al., "A hybrid lattice Boltzmann model for solid-liquid phase transition in presence of fluid flow," Physics Letters A, Mar. 6, 2006, 351(4-5):359-367.

(56) References Cited

OTHER PUBLICATIONS

Chen & Ohashi, "The foundation and its application of the lattice Boltzmann method," Simulation, Nippon-Steel Technical Information Center, Ltd., Sep. 15, 1998, 17(3): 43-49 (with abstract).
Chen et al., "Lattice Boltzmann method for fluid flows," Annual review of fluid mechanics, Jan. 1998, 30(1):329-64.
Chen et al., "Lattice Boltzmann Model for Stimulation of Magnetohydordynamicis," Physical Review Letters, vol. 67, No. 27 (Dec. 1991), pp. 3776-3779.
Chopard et al., Cellular Automata Model for Heat Conduction in a Fluid, Physics Letters A, vol. 126, Nos. 8, 9, pp. 476-480 (Jan. 1988).
Clougueur et al., "RAPI, A Cellular Automaton Machine for Fluid Dynamics," Complex Systems, pp. 585-597 (1987).
CN Office Action in Chinese Appln. No. 201480049496.X; dated Dec. 18, 2017; 18 pages (with English translation).
Demianov et al., "Density Functional Modelling in Multiphase Compositional Hydrodyanmics" Canadian J. Chem. Engine., Apr. 2011. 89:206-26.
D'Humieres et al., "2-D and 3-D Hydrodynamics on Lattice Gases," Fruhjahrstagung der Schweiz. Physikalischen Gesellschaft, vol. 59 (1986).
D'Humieres et al., "Lattice Gas Models for 3D Hydrodynamics," 2 (4), pp. 291-297 (1986).
D'Humieres et al., Numerial Simulations of Hydrodynamics with Lattice Gas Automata in Two Dimensions, Complex Systems 1:599-632 (1987).
Dyn et al., "Optimizing 3D Triangulations Using Discrete Curvature Analysis," Mathematical Methods for Curves and Surfaces: Oslo Jan. 1, 2001, 1:135-146.
Extended European Search Report in European Appln No. 21181213. 6, dated Nov. 10, 2021, 8 pages.
Fredkin et al., "Conservative Logic." International Journal of Theoretical Physics, vol. 21, Nos. 3/4, pp. 219-253 (1982).
Frisch et al., "Lattice Gas Hydrodynamics in Two and Three Dimensions." Complex Systems 1:649-707 (1987).
Frisch et al., "Lattice-Gas Automata for the Navier-Stokes Equation," Physical Review Letters, vol. 56, No. 14, pp. 1505-1508 (Apr. 1986).
Ginzburg et al., "Analysis and improvement of Brinkman lattice Boltzmann schemes: Bulk, boundary, interface. Similarity and distinctness with finite elements in heterogeneous porous media" Physical Review, 2015, 91:023307-1-32.
Google Search Results, Jun. 28, 2021, 1 pp. (Year: 2021.
Hamedi et al., "Pore-scale investigation of phase distribution and residual-oil development during secondary and tertiary solvent injection," SPE Reservoir Evaluation & Engineering. Feb. 1, 2015, 18(01):39-52.
Han et al., "Modelling of thermal contact resistance within the framework of the thermal lattice Boltzmann method," International Journal of Thermal Sciences, Oct. 1, 2008, 47(10):1276-1283.
Hardy et al., "Molecular Dynamics of a Classical Lattice Gas: Transport Properties and Time Correlation Functions." Physical Review A, vol. 13, No. 5, pp. 1949-1961 (May 1976).
Hasslacher, Discrete Fluids: Part I: Background for Lattice Gas Automata, Los Alamos Science Special Issue, pp. 175-217 (1987).
Healy et al., "Status of Miscible Flooding Technology," 14th World Petroleum Congress, Jan. 1, 1994, 407-409.
Henon, "Isometric Collision Rules for the Four-Dimensional FCHC Lattice Gas," Complex Systems 1:475-494 (1987).
Hoshen & Kopelman, "Percolation and cluster distribution. I. Cluster multiple labeling technique and critical concentration algorithm," Physical Review B, Oct. 15, 1976, 14:8:3438-3445.
Huang et al.; "Shan-and-Chen Type Multiphase Lattice Boltzmann Study of Viscous Coupling Effects for Two-Phase Flow in Porour Media," International Journal for Numerical Methods in Fluids, Sep. 30, 2009; 61(3):341-354.
Jiang et al, "Estimation of three-phase relative permeability by simulating fluid dynamics directly on rock-microstructure images," Jan. 5, 2017, 22 pages.

Kadanoff et al., "Transport Coefficients Near the Critical Point: A Master Equation Approach," 165 Phys. Review 310 (1968).
Kadanoff, "On Two Levels" Physics Today (Sep. 1986).
Karsch, "Lattice simulations of the thermodynamics of strongly interacting elementary particles and the exploration of new phases of matter in relativistic heavy ion collisions," InJournal of Physics: Conference Series 2006, 46(1):122-131.
Kaufman et al "Volume Graphics." IEEE, Jul. 1993, pp. 51-64.
Klein, "Negative Absolute Temperatures." Physical Review, vol. 104, No. 3, p. 589 (Nov. 1956).
Kovscek et al., "A Pore-Leval Scenario for the Development of Mixed-Wettability in Oil Reservoirs," Earth Science Division of Lawrence Berkeley Laboratory and Department of Chemical Engineering, prepared for U.S. Department of Energy, Sep. 1992, 1-58.
Krummel et al. "Visualizing Multiphase Flow and Trapped Fluid Configurations in a Model Three-Dimensional Porous Medium" (Year: 2013).
Ladd et al., "Lattice-Boltzmann simulations of particle-fluid suspensions," Journal of statistical physics, Sep. 1, 2001, 104(5-6):1191-251.
Lee et al. "A stable discretization of the lattice Boltzmann equation for simulation of incompressible two-phase flows at high density ratio," Journal of Computational Physics, Jun. 10, 2005, 206(1):16-47.
Lenormand et al., "Physics of Blob Displacement in a Two-Dimensional Porous Medium," Mar. 1988, SPE Formation Evaluation, pp. 271-275.
Li et al. "GPU-based numerical simulation of multi-phase flow in porous media using multiple-relaxation-time lattice Boltzmann method" (Year: 2013).
Li et al., "Upscaled Lattice Boltzmann Method for Simulations of Flows in Heterogeneous Porous Media," Geofluids, Feb. 2017, 2017:1-12.
Lin et al., "Plasma Simulation Using the Massively Parallel Processor," NASA CP-2478, pp. 185-191 (Jul. 1987).
Man et al., "Pore Network Modelling of Electrical Resistivity and Capillary Pressure Characteristics", Transport in Porous Media, Dec. 2000, 41(3):263-285.
Margolus et al., "Cellular-Automata Supercomputers for Fluid-Dynamics Modeling." Physical Review Letters, vol. 56, No. 16, pp. 1694-1696 (Apr. 1986).
Martys et al., "Multiscale modeling of fluid transport in heterogeneous materials using discrete Boltzmann methods," Materials and Structures, Dec. 2002, 35:650-9.
Mohammadmoradi et al., "Petrophysical Characterization of Porous Media Starting from Micro-Tomographic Images", Advances in Water Resources, May 2016, 35 pages.
Mohanty et al., Physics of Oil Entrapment in Water-Wet Rock, Feb. 1987, SPE Reservoir Engineering, pp. 113-128 (Year: 1987).
Molvig et al., "Fluid CAD That Challenges Computational Fluid Dynamics," Machine Design, Dec. 1994, 66(23):96-8.
Molvig et al., "Multi-species Lattice-Gas Automata for Realistic Fluid Dynamics," Springer Proceedings in Physics, vol. 46, pp. 206-231 (1990) (abstract only).
Molvig et al., "Removing the Discreteness Artifacts in 3D Lattice-Gas Fluids", Proceedings of the Workshop on Discrete Kinetic Theory, Lattice Gas Dynamics, and Foundations of Hydrodynamics, World Scientific Publishing Co., Pte., Ltd., Singapore (1989).
Motealleh et al., "Unified Model of Drainage and Imbibition in 3D Fractionally Wet Porous Media" Transport in Porous Media, Jul. 2013, 99(3):581-611.
One Petro Search Results, Jan. 26, 2021, 11 pp. (Year: 2021).
Pepiot et al., "Numerical analysis of the dynamics of two- and three-dimensional fluidized bed reactors using an Euler-Lagrange approach," Powder Technology, Apr. 1, 2012, 220: 104-121.
Perez et al., "OUPPI-1, ASIMD Computer Using Integrated Parallel Processors." Proc. of Compar Conf. Papers Plenary Sess. and Stream A Manchester, Sep. 12-16, 1988, British Comp. Soc. Parallel Proc. Spec. Group GB.
Petkov et al., "Efficient LBM visual simulation on face-centered cubic lattices," IEEE Transactions on Visualization and Computer Graphics, Feb. 27, 2009, 15(5):802-14.

(56) References Cited

OTHER PUBLICATIONS petrowiki.org/Miscible_flooding [online] "Miscible flooding" Aug. 19, 2013, retrieved on Oct. 10, 2019, retrieved from URL <https://petrowiki.org/Miscible_flooding>, 9 pages.

Prodanovic et al., "Investigating Matrix-Fracture Transfer via a Level Set Method for Drainage and Imbibition"; SPE Journal, vol. 15, No. 01; Mar. 1, 2010; 17 pages.

Prodanovic et al., "Physics-Driven Interface Modeling for Drainage and Imbibition in Fractures," Sep. 2009 SPE Journal, pp. 532-542 (Year: 2009).

Qian et al., "Lattice BGK Models for Navier-Stokes Equation." Europhysics Letters, 17(6):479-484 (1992).

Raabe, "Overview of the lattice Boltzmann method for nano-and microscale fluid dynamics in materials science and engineering," Modelling and Simulation in Materials Science and Engineering, Sep. 16, 2004, 12(6):R13-R46.

Ramsey, "Thermodynamics and Statistical Mechanics at Negative Absolute Temperatures." Physical Review, vol. 103, No. 1, pp. 20-28 (Jul. 1956).

Ramstad et al., "Relative Permeability Calculations from Two-Phase Flow Simulations Directly on Digital Images of Porous Rocks" Transp Porous Med (2012) 94:487-504 (Year: 2012).

Ramstad et al., "Simulation of two-phase flow in reservoir rocks using a lattice Boltzmann method," Spe Journal, Dec. 1, 2010, 15(04):917-27.

Rivet, "Three-Dimensional Lattice Gas Hydrodynamical Simulations: First Results." C.R. Acad. Sci. Paris, t. 305, Series II, pp. 751-756 (1987).

Rosenblum, "Photorealistic Terrain Imaging and Flight Simulation," IEEE, 1994 pp. 10-12.

Sheng et al., "Numerical Prediction of Relative Permeability from MicroCT Images: Comparison of Steady-State versus Displacement Methods," Oct.-Nov. 2, 2011, SPE Annual Technical Conference and Exhibition, Denver, Colorado, 16 pages.

Sohrabi et al., "Novel Insights into the Pore-scale Mechanisms of Enhanced Oil Recovery by CO2 Injection," 74th EAGE Conference and Exhibition, Jun. 4, 2012, 154529:1-14.

Sohrabi et al., "Visualisation of residual oil recovery by near-miscible gas and SWAG injection using high-pressure micromodels," Transport in Porous Media, Sep. 1, 2008, 74(2):239-57.

Suhrer et al., "Upscaling Method for Obtaining Primary Drainage Capillary Pressure and Resistivity Index with Digital Rock Physics,"IPTC-20035-ABSTRACT, 2020, 13 pages.

Teixeira, "Continuum Limit of Lattice Gas Fluid Dynamics." B.A. Sc. Engineering Science University of Toronto (1988).

Toffoli, "Cellular Automata as an Alternative to (Rather Than an Approximation of) Differentiation Equation in Modeling Physics." Physica 10D: 117-127 (1984).

Tsuji et al., "Characterization of immiscible fluid displacement processes with various capillary numbers and viscosity ratios in 3D natural sandstone," Advances in Water Resources, Sep. 1, 2016, 95:3-15.

Tucker, "Cellular Automata Machine: The Ultimate Parallel Computer," High Technology, pp. 85-87 (Jun. 1984).

Van Den Pijl, "Computation of bubbly flows with a mass-conserving level-set method," Dissertation at Delft University of Technology, Nov. 22, 2005, 139 pages.

Vichniac, "Cellular-Automata Fluids." Instabilities and Nonequilibrium Structures II, pp. 97-116 (1989).

Vichniac, "Stimulating Physics with Cellular Automata." Physica, 10D:96-110, 1984 (abstract only).

Wijk et al., "Three Ways to Show 3D Fluid Flow" IEEE Computer Graphics and Applications, Sep. 1994, 14(5):33-9.

Wolfram, "Cellular Automation Fluids 1: Basic Theory," J. Stat. Phys., vol. 45, Nos. 3/4, pp. 471-526 (1986).

Xu et al., "Continuous vs Discontinuous Capillary Desaturation and Implications for IOR/EOR," InPaper SCA2018-066 presented at at the International Symposium of the Society of Core Analysts held in Trondheim, Norway, Aug. 2018, 1-10.

Yiotis et al., "Blob population dynamics during immiscible two-phase flows in reconstructed porous media," Physical Review E, Mar. 4, 2013, 87(3):1-12.

Zhang et al., "Single Component, Multiphase Fluids Flow Simulation in Porous Media with Lattice Boltzmann Method" 2012 Fourth International Conference on Computational and Information Sciences (Year: 2012).

Zhu et al., "Extending a Gray Lattice Boltzmann Model for Simulating Fluid Flow in Multi-Scale Porous Media," Sci. Rep., Apr. 2018, 8(5826):1-19.

Pereira, "Fluid Flow, Relative Permeabilities and Capillary Pressure Curves Through Heterogeneous Porous Media," Applied Mathematical Modelling, May 31, 2019, vol. 75, p. 481-493.

U.S. Appl. No. 18/317,473, Crouse et al., filed May 15, 2023.

Dixit et al., "Pore-scale modeling of wettability effects and their influence on oil recovery," SPE Reservoir Evaluation & Engineering, Feb. 1999, 2(1) 25-36.

Extended European Search Report in EP Appln. No. 18744797.4, dated Dec. 5, 2019, 10 pages.

Extended European Search Report in EP Appln. No. 19738994.3, dated Feb. 2, 2021, 12 pages.

Extended European Search Report in EP Appln. No. 20194619.1, dated Jan. 28, 2021, 6 pages.

Extended European Search Report in European Appln No. 21212490.3, dated May 23, 2022, 8 pages.

Extended European Search Report in European Appln. No. 19192927.2, dated Jan. 7, 2020, 9 pages.

International Preliminary Report on Patentability in International Appln. No. PCT/US2019/013079, dated Jul. 14, 2020, 10 pages.

International Search Report and Written Opinion in International Appln. No. PCT/US2019/013079, dated Apr. 1, 2019, 11 pages.

International Search Report and Written Opinion, in International Appln. No. PCT/US2014/038143, dated Sep. 10, 2014, 9 pages.

International Search Report and Written Opinion, in International Appln. No. PCT/US2015/021075, dated Jul. 8, 2015, 9 pages.

International Search Report and Written Opinion, in International Appln. No. PCT/US2018/015408, dated Mar. 12, 2018, 6 pages.

Office Action in Chinese Appln. No. 201580021949.2, dated Aug. 10, 2018, 103 pages (with English translation).

Office Action in Chinese Appln. No. 201880014907.X, dated Mar. 3, 2021, 6 pages (with English Translation).

Office Action in Chinese Appln. No. 201880014907.X, dated Sep. 3, 2020, 13 pages (with English Translation).

Office Action in Chinese Appln. No. 201980012848.7, dated Feb. 1, 2023, 27 pages (with English translation).

Office Action in Europe Appln. No. 19738994.3, dated Sep. 21, 2022, 11 pages.

Office Action in European Appln. No. 15764161.4-1001, dated Apr. 15, 2019, 8 pages.

Office Action in European Appln. No. 19192927.2 dated Jan. 7, 2020, 9 pages.

Office Action in Japanese Appln. No. 2016-507600, dated Jul. 10, 2018, 23 pages (with English translation).

Office Action in Japanese Appln. No. 2016-514084, Jun. 21, 2018, 6 pages (with English translation).

Office Action in Japanese Appln. No. 2020538656, dated Dec. 5, 2022, 16 pages (with English translation).

Supplemental European Search Report and Written Opinion, in European U.S. Appl. No. 14/797,363, filed Apr. 18, 2017, 11 pages.

Supplemental European Search Report in U.S. Appl. No. 15/764,161, dated Nov. 10, 2017, 9 pages.

Supplemental European Search Report in European Appln. No. 14832274.6, Apr. 3, 2017, 7 pages.

Office Action in Japanese Appln. No. 2020-538656, dated Jul. 21, 2023, 6 pages (with English translation).

* cited by examiner

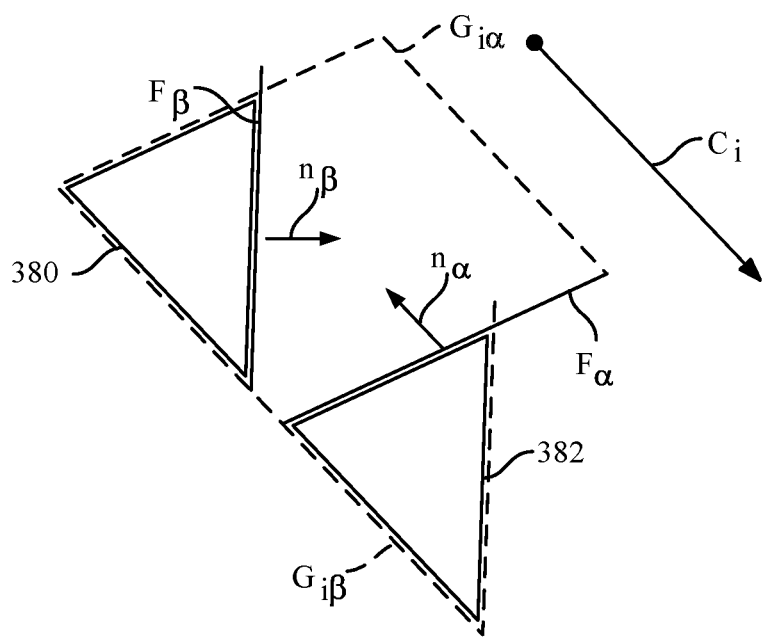
FIG. 15
prior art
FIG. 14
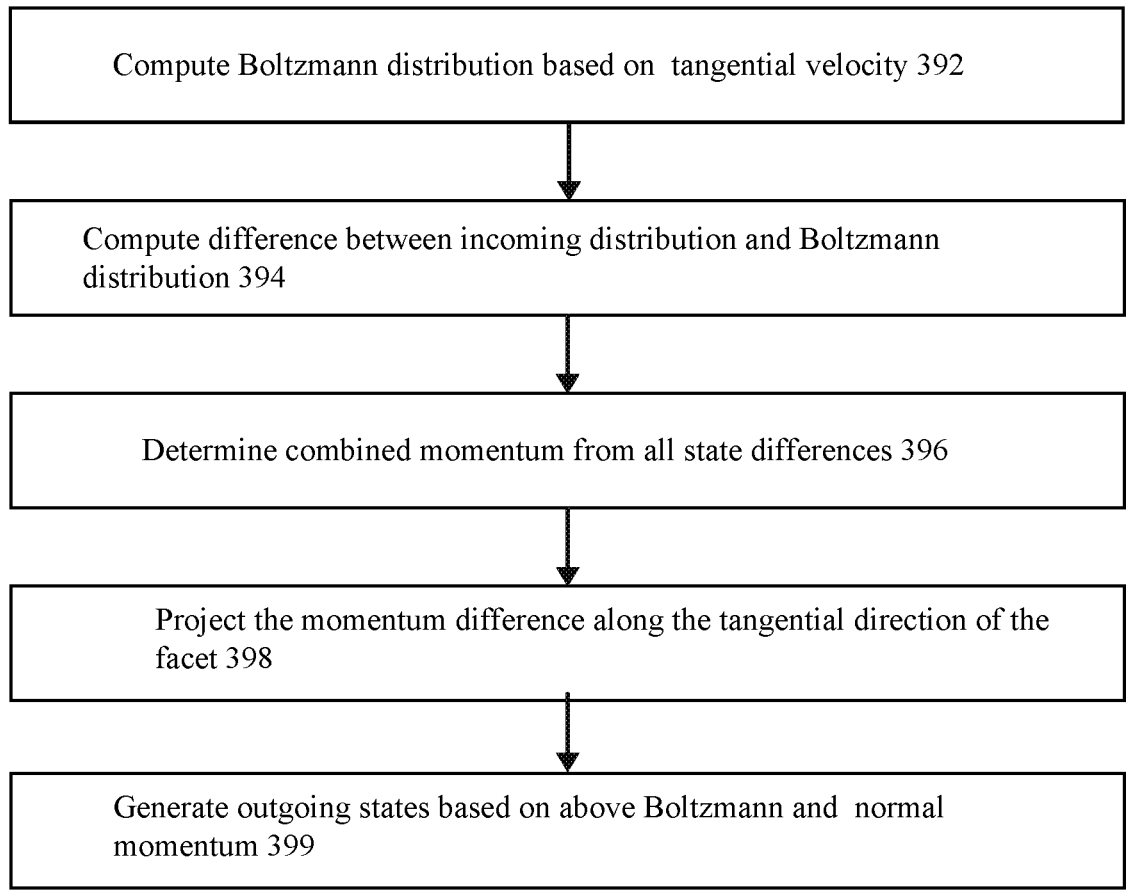

COMPUTER SYSTEM FOR SIMULATING PHYSICAL PROCESSES USING SURFACE ALGORITHM

BACKGROUND OF THE INVENTION

This description relates to simulating physical processes, e.g., fluid flow.

Lattice Boltzmann Method (LBM) is used to simulate a wide range of complex fluid flows around various geometric shapes, such as cars and airplanes. One of the critical parts of the overall solver is its algorithm in dealing with boundary conditions, namely an algorithm that handles the dynamics of LBM particle distributions at the edge of a fluid computational domain, such as near the surface of a solid wall. How well such an algorithm is formulated has direct consequences on the resulting accuracy of a simulation.

U.S. Pat. No. 5,848,260 described a novel technique ('260 slip algorithm) for a volumetric based formulation that ensured an exact conservation of mass as well as a precise enforcement of momentum fluxes across a boundary surface.

SUMMARY OF THE INVENTION

Although the patented approach has enjoyed great successes, there are some limitations. For example, resulting fluid quantities near the wall exhibit higher than desired artificial noisiness. Such an artifact manifests as effective surface roughness resulting in an increased numerical dissipation and thicker than desired boundary layer. This may adversely impact a next level accuracy of simulations, especially for very smooth and streamlined bodies. Secondly, the stability range of the patented process is not sufficiently high, hence it has limited its ability for simulation of higher speed fluid flows.

The process, or slip algorithm, described in the '260 patent is based on a volumetric representation of the lattice Boltzmann fluid domain together with a surface representation. In the '260 patent, the surface is described as a set of surface elements each of which has a specific surface area and surface normal. In the '260 patent, the boundary condition is realized by interactions of neighboring surface elements with the particles in the fluid domain.

However, in a novel slip algorithm discussed herein, the boundary condition is provided by interactions of all surface elements with the particles in the fluid domain, as defined by three fundamental processes of:

Gather incoming distribution functions (corresponding to those particles moving toward the boundary surface) from the fluid domain near a boundary surface according to the so-called parallelograms/parallelepipeds. Surface dynamics involves converting the set of incoming distribution functions to the set of outgoing distribution functions (corresponding to those particles reflected from the boundary surface) satisfying specific boundary conditions on mass and momentum fluxes through the boundary. Distribute the outgoing distribution functions back into the fluid domain near the boundary according to the parallelograms/parallelepipeds.

This approach significantly addresses the aforementioned limitations. Although the new approach has an overall framework similar to that in the '260 patent, there is a significant change in the surface dynamics of converting the set of incoming distribution functions to the set of outgoing distributions. More specifically, the process used in the surface dynamics is substantially changed in order to realize a zero momentum flux through the surface. Achieving an exactly zero tangential momentum flux is at the foundation of an accurate boundary condition algorithm, so that any specific amount of momentum flux could be subsequently added precisely. This change assists in overcoming the aforementioned long standing limitations.

According to an aspect, a computer implemented method for simulating elements of a fluid flow includes storing in a memory state vectors for a plurality of voxels, the state vectors comprising a plurality of entries that correspond to particular momentum states of a plurality of possible momentum states at a voxel, storing in a memory a representation of at least one surface that is sized and oriented independently of the size and orientation of the voxels, performing interaction operations on the state vectors, the interaction operations modelling interactions between elements of different momentum states, performing surface interaction operations on the representation of the surface, the surface interaction operations modelling interactions between the surface and substantially all elements of voxels, and performing move operations on the state vectors to reflect movement of elements to new voxels.

According to an additional aspect, a data processing system for simulating elements of a fluid flow, the data processing system includes instructions for causing the data processing system to store in a memory state vectors for a plurality of voxels, the state vectors comprising a plurality of entries that correspond to particular momentum states of a plurality of possible momentum states at a voxel, store in a memory a representation of at least one surface that is sized and oriented independently of the size and orientation of the voxels, perform interaction operations on the state vectors, the interaction operations modelling interactions between elements of different momentum states, perform surface interaction operations on the representation of the surface, the surface interaction operations modelling interactions between the surface and substantially all elements of voxels, and perform move operations on the state vectors to reflect movement of elements to new voxels.

According to an additional aspect, a non-transitory computer readable medium stores a computer program product for simulating elements of a fluid flow, the computer program product includes instructions for causing a data processing system to store in a memory state vectors for a plurality of voxels, the state vectors comprising a plurality of entries that correspond to particular momentum states of a plurality of possible momentum states at a voxel, store in a memory a representation of at least one surface that is sized and oriented independently of the size and orientation of the voxels, perform interaction operations on the state vectors, the interaction operations modelling interactions between elements of different momentum states, perform surface interaction operations on the representation of the surface, the surface interaction operations modelling interactions between the surface and substantially all elements of voxels, and perform move operations on the state vectors to reflect movement of elements to new voxels.

One or more of the above aspects may include amongst features described herein one or more of the following features.

The instructions to perform the surface interaction operations includes instructions to gather elements from a first set of at least one voxel that interacts with a facet, model interactions between the gathered elements and all of facets to produce a set of surface interacted elements, and scatter the surface interacted elements to a second set of at least one voxel that interacts with the facet. An entry of a state vector represents a density of elements per unit volume in a particular momentum state of a voxel. A state vector includes one or more of a plurality of integers and/or floating point values that represent a density of elements per unit volume in a particular momentum state and have more plural possible values.

The surface interaction operations are performed using one or more of integer values and/or floating point values, and wherein the surface interaction operations are performed using values representative of real numbers. The surface interaction operations are performed using integer and/or floating point numbers. The surface interaction operations include represent a voxel that is intersected by a surface as a partial voxel. The representation of at least one surface includes a plurality of facets that are sized and oriented independently of the size and orientation of the voxels, and represent at least one surface; and further includes model interactions between a facet and the elements of at least one voxel near the facet.

The elements represent particles of a fluid and the facets represent at least one surface over which the fluid flows.

Perform the surface interaction operations includes compute differences between incoming distribution and a Boltzmann distribution, determine combined momentum from all state vector differences, and generate outgoing distribution based on the determined differences.

One or more of the above aspects may provide one or more of the advantages disclosed herein.

Besides dealing with boundary conditions on a solid wall surface, the slip algorithm can also be applied to handle fluid boundaries between domains of two different lattice Boltzmann solvers as well as two different reference frames. Different from a solid wall, the mass flux across the boundary is in general not zero. Furthermore, the momentum flux contains an extra term that represents the flow convection across from one domain to another. All these involve a straightforward albeit non-trivial extension of the previous slip algorithm (260) for a solid surface.

Other features and advantages of the invention will be apparent from the following detailed description of the preferred embodiments, and from the claims.

BRIEF DESCRIPTION OF THE DRAWINGS

FIG. 14 illustrates a flow chart for a novel surface dynamics.

FIG. 15 is a flow chart of a procedure for performing surface dynamics (prior art).

Figure 1:
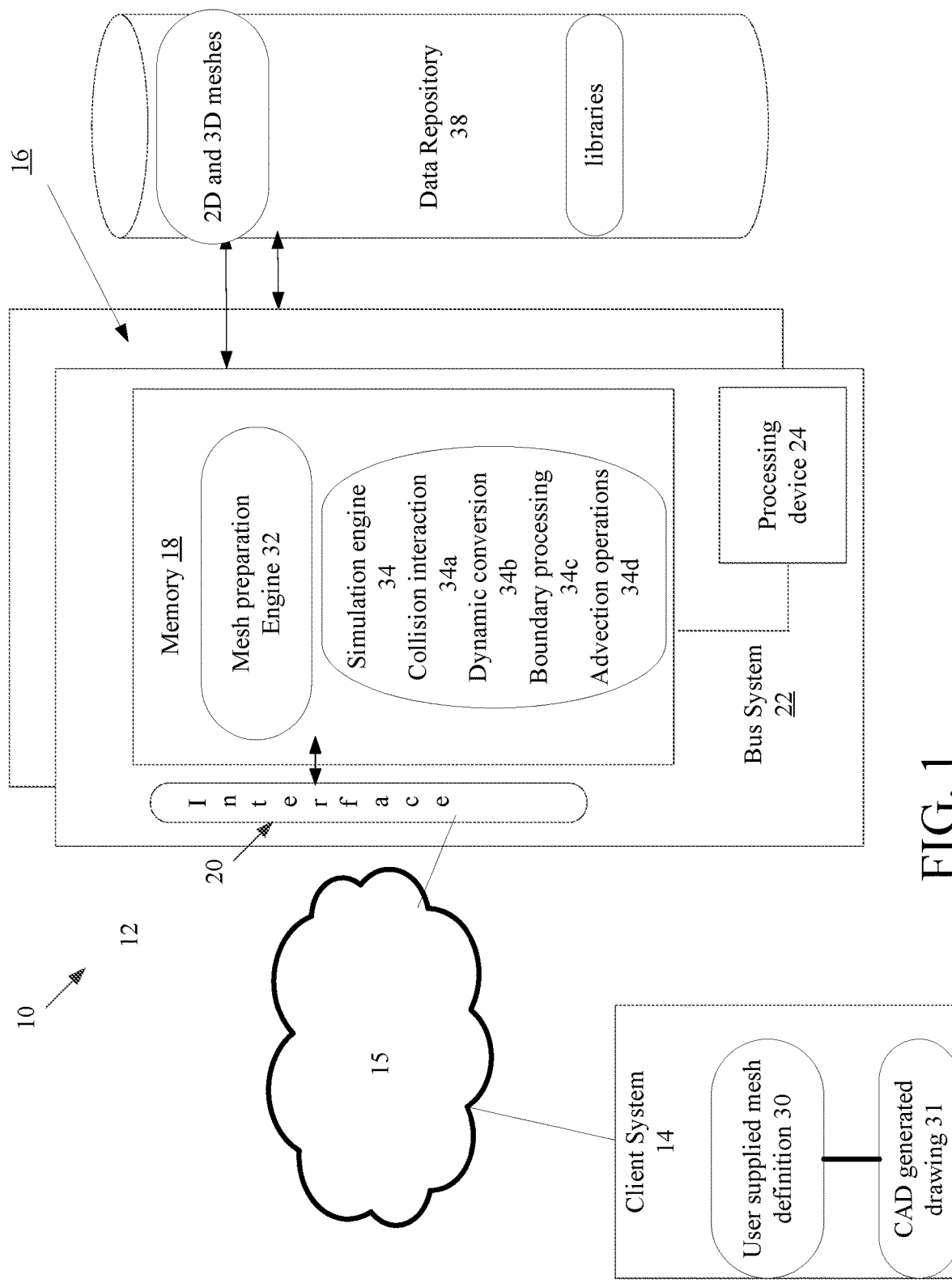
FIG. 1 depicts a system for simulation of fluid flows, which includes a novel surface dynamics conversion.

The details of one or more embodiments of the invention are set forth in the accompanying drawings and the description below. Other features, objects, and advantages of the invention are apparent from the description and drawings, and from the claims.

DESCRIPTION

One method for simulating fluid flows is the so-called the Lattice Boltzmann Model (LBM). In a LBM-based physical process simulation system, fluid flow is represented by distribution function values, evaluated at a set of discrete velocities using the well-known lattice Boltzmann equation (see Eq. 1 below) that describes the time-evolution of the distribution function. The distribution function involves two processes, a streaming process and a collision process.

The surface dynamics maps/converts a set of "incoming" particle distributions to a set of "outgoing" particle distributions so that an exactly zero tangential momentum flux boundary condition is achieved. As mentioned above, it is this particular portion that is significantly different from the '260 patent. Before we describe the specific algorithmic difference below in the surface dynamics step, let us first outline of the concept of the surface dynamics below.

On each surface element, let $f_i^{in}$ represent an incoming particle distribution function obtained from the Gather Step. It corresponds to the number of particles per unit volume in space near the surface element having a velocity value $c_i$ pointing towards the surface (i.e., $c_i \cdot \hat{n}<0$), where $\hat{n}$ denotes the unit normal vector to the surface element pointing towards the flow domain. The entire set of the incoming distributions includes all possible $c_i$ values that are pointing to the surface, i.e., $\{f_i^{in}; \forall c_i \cdot \hat{n}<0\}$.

The surface dynamics determines the values of the "outgoing" distribution functions on the surface element based on the values of the known values of the "incoming" distribution functions. An "outgoing" distribution function $f_i^{out}$ corresponds to the number of particles per unit volume in space near the surface having a velocity value $c_i$ pointing away from the surface (i.e., $c_i \cdot \hat{n}>0$).

Symbolically, the surface dynamics is defined as the following logical conversion, $$\{f_i^{in}; \forall c_i \cdot \hat{n}<0\} \to \{f_i^{out}; \forall c_i \cdot \hat{n}>0\} \quad (Eq. 1)$$

where the left side of Eq. 1 in the above is the set of the incoming distribution functions obtained through the gather step, while the right side of Eq. 1 is the set of the outgoing distribution functions whose values are determined via the surface dynamics step. There are two fundamental fluxes through the surface of a boundary. These are the mass and momentum fluxes defined via the mathematical expressions below.

Mass flux, $$M = \sum_{\forall i; (c_i \cdot \hat{n}>0)} A|c_i \cdot \hat{n}|f_i^{out} - \sum_{\forall i; (c_i \cdot \hat{n}<0)} A|c_i \cdot \hat{n}|f_i^{in} \quad (Eq. 2)$$

and momentum flux, $$P = \sum_{\forall i; (c_i \cdot \hat{n}>0)} c_i A|c_i \cdot \hat{n}|f_i^{out} - \sum_{\forall i; (c_i \cdot \hat{n}<0)} c_i A|c_i \cdot \hat{n}|f_i^{in} \quad (Eq. 3)$$

where A is the area of the surface element.

The fluid boundary conditions are in general defined such that the mass $\mathcal{M}$ and the momentum P obey some specified values on the boundary surface of the fluid solver. In particular, since particles cannot penetrate a solid wall, a zero mass flux condition, $\mathcal{M}=0$ is enforced. A zero tangential momentum flux through the surface amounts to having $P \cdot \hat{\tau} = 0$.

On a solid wall, this is equivalent to having a frictionless boundary condition. Here $\hat{\tau}$ is any vector that is tangential to the surface element, so that $\hat{\tau} \cdot \hat{n} = 0$.

The surface dynamics in a slip algorithm is a relationship that converts the values of the incoming distribution functions to the values of the outgoing distributions so that the two flux conditions with specified values are satisfied. Having achieved a zero mass flux condition and a zero tangential momentum flux condition, the rest of the process for satisfying the overall mass and momentum flux conditions with specified values are the same between the '260 patent and the novel approach, so it is not discussed here.

Since there are more distribution functions than the two flux conditions, the values of the outgoing distributions are not unique. Indeed, the '260 patent and current approach give different values due to their difference in the relationship linking the incoming distribution functions to the outgoing distribution functions.

Surface Dynamics Algorithm for Zero Tangential Momentum Flux

The specific relationship in '260 patent satisfying the zero mass flux and the zero tangential momentum flux is given by the following formulation, $$f_i^{out} = f_i^{eq} + f_{i*}^{eq} - f_{i*}^{in} \qquad (Eq.\ 4)$$

where i* is the parity lattice velocity direction to i, i.e. $c_i = -c_{i*}$. Computation of the equilibrium distributions $f_i^{eq}$ and $f_{i*}^{eq}$ are based on the sampled values of density and velocity. A complete description of the computation is specified in the '260 patent.

For example, for an isothermal LBM solver, the equilibrium distribution is given by Eq. 5

$$f_i^{eq} = \rho w_i \left( 1 + \frac{(c_i \cdot u)}{T_0} + \frac{(c_i \cdot u)^2}{2T_0^2} - \frac{u^2}{2T_0} + \frac{(c_i \cdot u)^3}{6T_0^3} - \frac{(c_i \cdot u)u^2}{2T_0^2} \right) \qquad (Eq.\ 5)$$

where $w_i$ and $T_0$ are known constants in a lattice Boltzmann model. Here the density $\rho$ and velocity u (with $u \cdot \hat{n} = 0$) are sampled from the fluid domain near the surface. Furthermore, $\rho$ is rescaled so that the zero mass flux condition is satisfied via satisfying the following relationship:

$$\sum_{\forall i; (c_i \cdot \hat{n} < 0)} |c_i \cdot \hat{n}| f_i^{eq} = \sum_{\forall i; (c_i \cdot \hat{n} < 0)} |c_i \cdot \hat{n}| f_i^{in} \qquad (Eq.\ 6)$$

Plugging the expression (Eq. 4) together with (Eq. 5) into the momentum flux definition (Eq. 3), we can prove that, $P = p\hat{n}$. Therefore momentum flux along tangential direction, $P \cdot \hat{\tau}$ is zero.

Here the quantity $p = \rho T_0$ denotes the pressure value on the surface. More general boundary conditions can be achieved by adding appropriate mass and momentum fluxes on top of the zero mass and zero tangential momentum flux conditions, which are described here.

One distinct feature in the '260 patent formulation is its direct one-to-one dependence of the outgoing distribution $f_i^{out}$ to the incoming distribution $f_i^{in}$ as demonstrated in Eq. (4). This is now understood as being a major source of or for at least some of the deficiencies discussed previously.

Referring now to FIG. 1, a system 10 that executes a Lattice Boltzmann (LB) based simulation includes a novel surface dynamics conversion 34b. The system 10 in this implementation is based on a client-server or cloud based architecture and includes a server system 12 implemented as a massively parallel computing system 12 (stand alone or cloud-based) and a client system 14 coupled via a network 15. The server system 12 includes memory 18, a bus system 11, interfaces 20 (e.g., user interfaces/network interfaces/display or monitor interfaces, etc.) and a processing device 24. In memory 18 are a mesh preparation engine 32 and a simulation engine 34.

While FIG. 1 shows the mesh preparation engine 32 in memory 18, the mesh preparation engine can be a third party application that is executed on a different system than server 12. Whether the mesh preparation engine 32 executes in memory 18 or is executed on a different system than server 12, the mesh preparation engine 32 receives a user-supplied mesh definition 30 and the mesh preparation engine 32 prepares a mesh and sends (and or stores) the prepared mesh to the simulation engine 34.

The simulation engine 34 includes a collision interaction module 34a that includes the novel surface dynamics conversion 34b, boundary module 34c, and advection particle collision interaction module 34d. The system 10 accesses a data repository 38 that stores 2D and/or 3D meshes (Cartesian and/or curvilinear), coordinate systems, and libraries.

Figure 2:
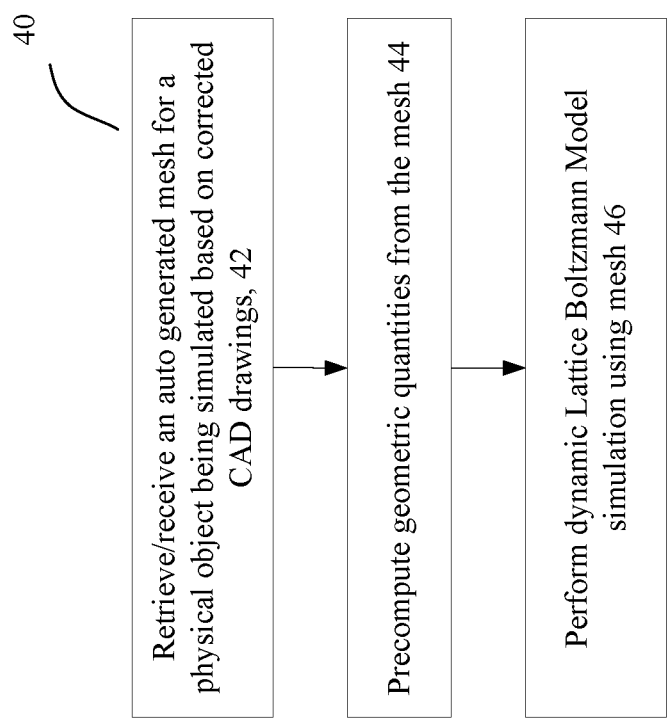
FIG. 2 depicts a flow chart showing operations for formulation of a Lattice Boltzmann Model simulation with the surface dynamics conversion.

Referring now to FIG. 2, a process 40 for simulating fluid flow about a representation of a physical object is shown. In the example that will be discussed herein, the physical object is an airfoil. The use of an airfoil is merely illustrative however, as the physical object can be of any shape, and in particular can have planar and/or curved surface(s). The process 40 receives 42, e.g., from client system 14 or retrieves from the data repository 38, a mesh (or grid) for the physical object being simulated. In other embodiments, either an external system or the server 12 based on user input, generates the mesh for the physical object being simulated. The process precomputes 44 geometric quantities from the retrieved mesh and performs dynamic Lattice Boltzmann Model simulation 46 using the precomputed geometric quantities corresponding to the retrieved mesh. Lattice Boltzmann Model simulation includes the simulation 46 of evolution of particle distribution that includes the surface dynamics conversion, boundary modeling, and advection of particles to a next cell in the LBM mesh.

Figure 3:
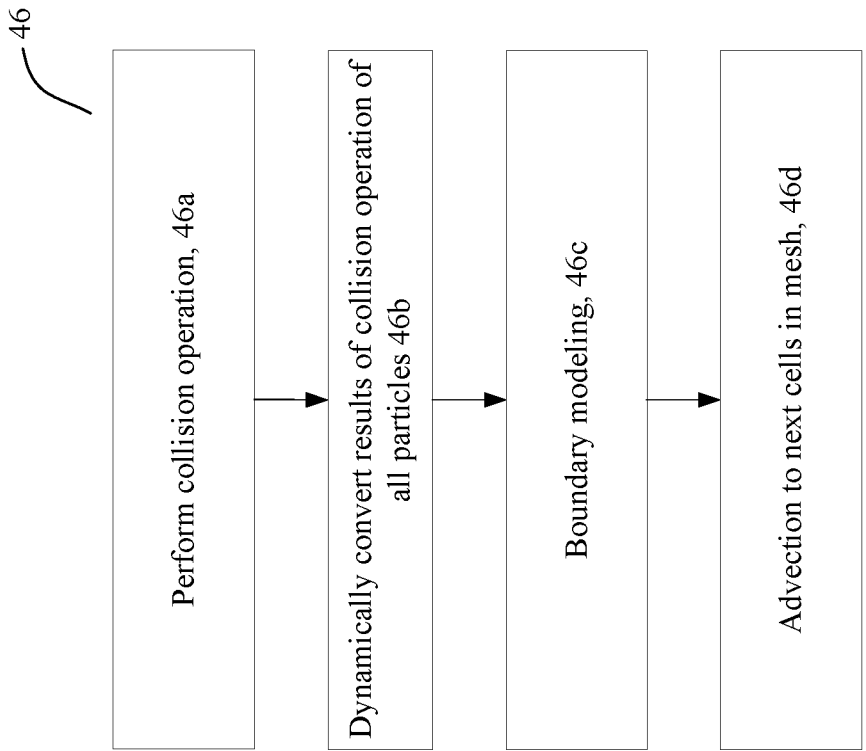
FIG. 3 depicts a flow chart showing simulation operations using the Lattice Boltzmann model with the surface dynamics conversion.

Referring to FIG. 3, the simulation process 46 simulates evolution of particle distribution according to a modified lattice Boltzmann process (LBp), e.g., adapted for the novel surface dynamics conversion 34b (FIG. 1). The process 46 (see FIG. 2) performs a collision operation 46a, dynamically converts results of all collision operations of all particles 46b, followed by boundary modeling 46c, and an advection 46c of particles to next cells in the LBM space.

Figure 4:
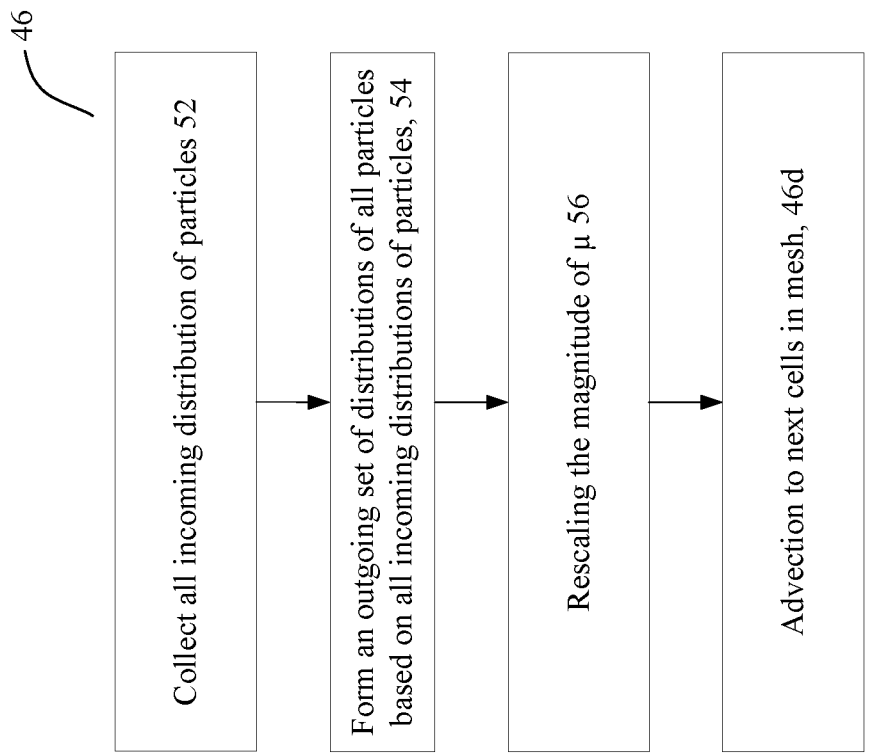
FIG. 4 depicts a flow chart showing dynamic conversion.

Referring now to FIG. 4, the simulation process 46 simulating a time evolution of particles performs a generally conventional collision operation 46a, boundary modeling 46c and advection 46d processes. However, the conversion of a set of incoming particle distribution to a set of outgoing particle distribution, as described in the '260 patent is replaced by a dynamically conversion process that takes the results of all incoming particle distributions 46b to formulate each set of outgoing particle distributions. The dynamic conversion 46b includes collecting 52 all incoming set of distributions from mesh locations from the collision operation, rather than collecting a set of incoming distributions from neighboring mesh locations. This new formulation, avoids the one-to-one dependence as in the '260 patent described above, and replace that dependency so that each "outgoing" distribution function 54 depends on all "incoming" distributions.

Instead of Eq. 4, the new relationship given in the novel approach is defined via the mathematical formulation below $$f_i^{out} = f_i^{eq} - \delta f_i \quad \text{(Eq. 7)}$$

where $\delta f_i$ is defined by $$\delta f_i = \frac{2w_i}{T_0^2}(c_i \cdot \hat{n})(c_i \cdot h) \quad \text{(Eq. 8)}$$

The quantity h is defined by $$h = \sum_{i,(c_i \cdot \hat{n})<0} (c_i \cdot \hat{n})(c_i \cdot \hat{n}(c_i \cdot \hat{n}))(f_i^{in} - f_i^{eq}) \quad \text{(Eq. 9)}$$

In (Eq. 9), the equilibrium distribution is defined in the same way as in (Eq. 5). In construction of $f_i^{eq}$ besides applying the density rescaling in order to satisfy the same mass flux constraint given by (Eq. 6), we need in the new formulation an additional constraint on the tangential part of the equilibrium momentum flux, $$\sum_{i,c_i \cdot \hat{n}<0} |c_i \cdot \hat{n}|(c_i \cdot \hat{\tau})f_i^{eq} = \sum_{i,c_i \cdot \hat{n}<0} |c_i \cdot \hat{n}|(c_i \cdot \hat{\tau})f_i^{in} \quad \text{(Eq. 10)}$$

where the unit vector $\hat{\tau}$ is parallel to the sampled velocity direction u. Since the latter is projected onto the surface element, u·$\hat{n}$=0, thus $\hat{\tau}$·$\hat{n}$=0. Constraint (Eq. 10) can be accomplished via rescaling the magnitude of u.

Like the '260 patent approach, it can be shown the novel approach as defined by (Eq. 7)-(Eq. 9) also achieves the boundary condition of the zero mass and zero tangential momentum fluxes.

In spite of the seemingly more complex steps, the key difference in the new formulation is its avoidance of the one-to-one relationship between an outgoing distribution and an incoming distribution. Indeed as shown in (Eq. 7)-(Eq. 9), an outgoing distribution $f_i^{out}$ is dependent on all incoming distributions through their moment summation expressed in (Eq. 9).

The new formulation may significantly overcome the aforementioned deficiencies and give a less noisy surface and support higher fluid speed near the boundary.

Detailed Example

In the procedure discussed in FIG. 7 below, a flow simulation process is described using CAD drawings with the identified void space to configure a simulation space. In the FIGS. 5 and 6 that precede and FIG. 8, FIGS. 9A-9B, FIGS. 10 and 11, and FIGS. 12, 13 and 15, each of these figures are labeled as prior art because these figures appear in the above referenced patent.

However, the figures as they appear in the above patent do not take into consideration any modifications that would be made to a flow simulation using the dynamic conversion process 46b, because that process described herein is not described in the above referenced patent.

Model Simulation Space

In a LBM-based physical process simulation system, fluid flow is represented by the distribution function values $f_i$, evaluated at a set of discrete velocities $c_i$. The dynamics of the distribution function is governed by Equation I.1

$$f_i(x+c_i, t+\delta t) = f_i(x,t) - \frac{1}{\tau}(f_i(x,t) - f_i^{eq}) \quad \text{Eq. (I.1)}$$

where $f_i^{eq}$ is known as the equilibrium distribution function, defined as:

$$f_i^{eq} = \rho w_i \left(1 + \frac{(c_i \cdot u)}{T_0} + \frac{(c_i \cdot u)^2}{2T_0^2} - \frac{u^2}{2T_0} + \frac{(c_i \cdot u)^3}{6T_0^3} - \frac{(c_i \cdot u)u^2}{2T_0^2}\right)$$

Equation (I.1) is the well-known lattice Boltzmann equation that describes the time-evolution of the distribution function, $f_i$. The left-hand side represents the change of the distribution due to the so-called "streaming process." The streaming process is when a pocket of fluid starts out at a mesh location, and then moves along one of plural velocity vectors to the next mesh location. At that point, the "collision factor," i.e., the effect of nearby pockets of fluid on the starting pocket of fluid, is calculated. The fluid can only move to another mesh location, so the proper choice of the velocity vectors is necessary so that all the components of all velocities are multiples of a common speed.

The right-hand side of the first equation is the aforementioned "collision operator" which represents the change of the distribution function due to the collisions among the pockets of fluids. The particular form of the collision operator is of the Bhatnagar, Gross and Krook (BGK) operator. The collision operator forces the distribution function to go to the prescribed values given by the second equation, which is the "equilibrium" form.

The BGK operator is constructed according to the physical argument that, no matter what the details of the collisions, the distribution function approaches a well-defined local equilibrium given by $\{f^{eq}(x, v, t)\}$ via collisions:

$$C = -\frac{1}{\tau}(f - f^{eq}), \quad \text{Eq. (I.2)}$$

where the parameter $\tau$ represents a characteristic relaxation time to equilibrium via collisions. Dealing with particles (e.g., atoms or molecules) the relaxation time is typically taken as a constant.

From this simulation, conventional fluid variables, such as mass $\rho$ and fluid velocity u, are obtained as simple summations in Equation (I.3).

$$\rho(x,t) = \sum_i f_i(x,t); \; \rho u(x,t) = \sum_i c_i f_i(x,t); \quad \text{Eq. (I.3)}$$

$$DT(x,t) = \sum_i (c_i - u)^2 f_i(x,t)$$

where ρ, u, and T are, respectively, the fluid density, velocity and temperature, and D is the dimension of the discretized velocity space (not necessarily equal to the physical space dimension).

Due to symmetry considerations, the set of velocity values are selected in such a way that they form certain lattice structures when spanned in the configuration space. The dynamics of such discrete systems obeys the LBE having the form $$f_i(x+c_i,t+1)-f_i(x,t)=C_i(x,t)$$

where the collision operator usually takes the BGK form as described above. By proper choice of the equilibrium distribution forms, it can be theoretically shown that the lattice Boltzmann equation gives rise to correct hydrodynamics and thermo-hydrodynamics. That is, the hydrodynamic moments derived from $f_i(x,t)$ obey the Navier-Stokes equations in the macroscopic limit. These moments are defined by Equation (I.3) above.

The collective values of $c_i$ and $w_i$ define a LBM model. The LBM model can be implemented, efficiently on scalable computer platforms and run with great robustness for time unsteady flows and complex boundary conditions.

A standard technique of obtaining the macroscopic equation of motion for a fluid system from the Boltzmann equation is the Chapman-Enskog method in which successive approximations of the full Boltzmann equation are taken. In a fluid system, a small disturbance of the density travels at the speed of sound. In a gas system, the speed of sound is generally determined by the temperature. The importance of the effect of compressibility in a flow is measured by the ratio of the characteristic velocity and the sound speed, which is known as the Mach number.

A general discussion of a LBM-based simulation system is provided below that includes the dynamic conversion 46b to conduct fluid flow simulations. For a further explanation of LBM-based physical process simulation systems the reader is referred to the above incorporated by reference US patent.

Figure 5:
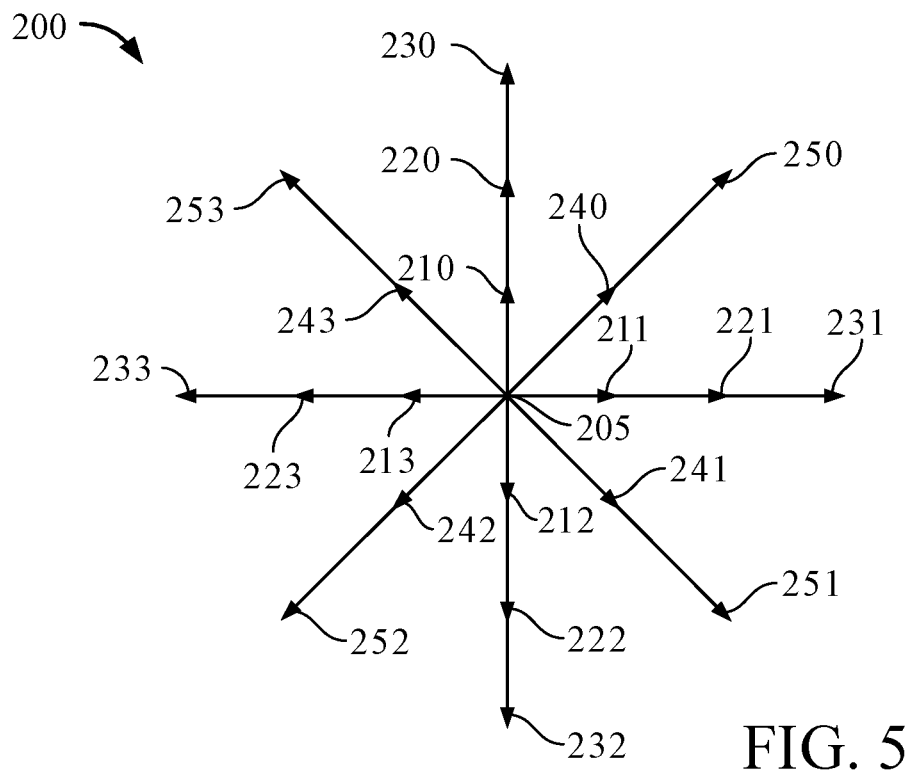
FIGS. 5 and 6 illustrate velocity components of two LBM models represented in Euclidean space (prior art).

Referring to FIG. 5, a first model (2D-1) 200 is a two-dimensional model that includes 21 velocities. Of these 21 velocities, one (205) represents particles that are not moving; three sets of four velocities represent particles that are moving at either a normalized speed (r) (210-213), twice the normalized speed (2r) (220-223), or three times the normalized speed (3r) (230-233) in either the positive or negative direction along either the x or y axis of the lattice; and two sets of four velocities represent particles that are moving at the normalized speed (r) (240-243) or twice the normalized speed (2r) (250-253) relative to both of the x and y lattice axes.

Figure 6:
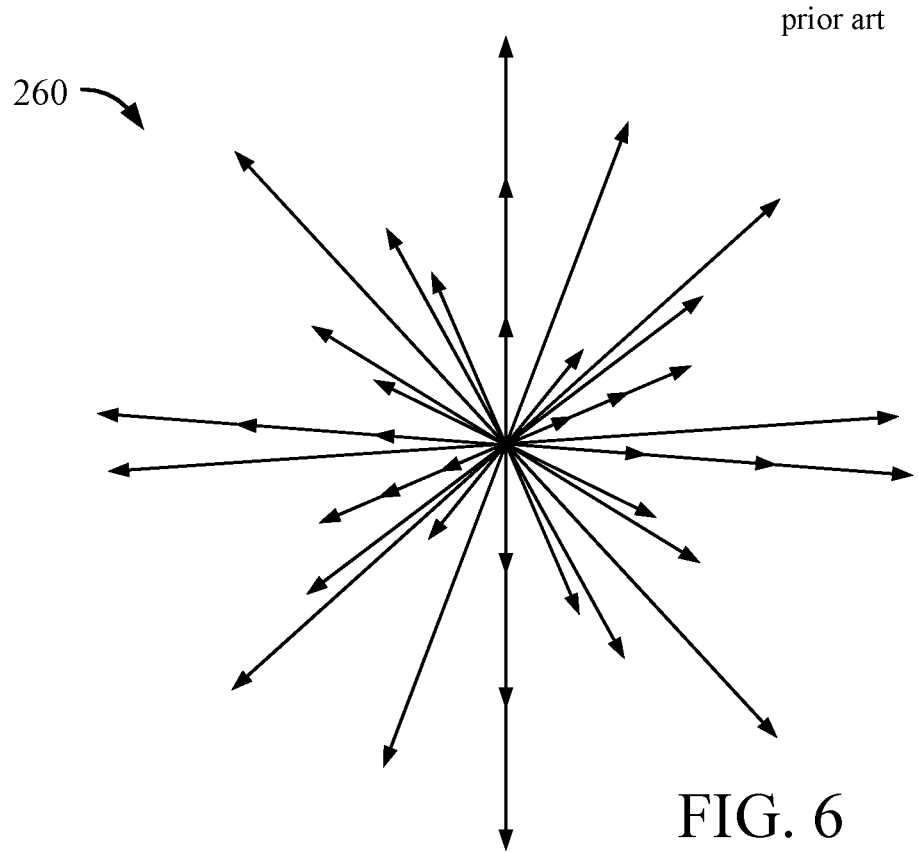
Figure 10:
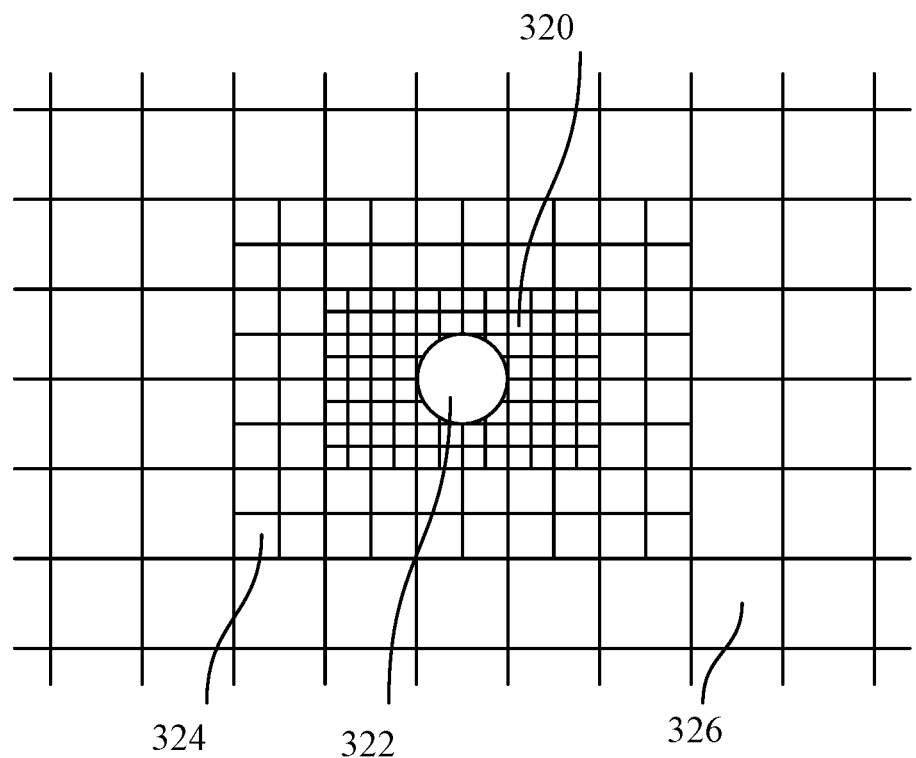
FIGS. 10 and 11 illustrate variable resolution techniques (prior art).

Referring to FIG. 6, illustrated is a second model (3D-1) 260—a three-dimensional model that includes 39 velocities where each velocity is represented by one of the arrowheads of FIG. 10. Of these 39 velocities, one represents particles that are not moving; three sets of six velocities represent particles that are moving at either a normalized speed (r), twice the normalized speed (2r), or three times the normalized speed (3r) in either the positive or negative direction along the x, y or z axis of the lattice; eight represent particles that are moving at the normalized speed (r) relative to all three of the x, y, z lattice axes; and twelve represent particles that are moving at twice the normalized speed (2r) relative to two of the x, y, z lattice axes.

More complex models, such as a 3D-2 model includes 101 velocities and a 2D-2 model includes 37 velocities also may be used. For the three-dimensional model 3D-2, of the 101 velocities, one represents particles that are not moving (Group 1); three sets of six velocities represent particles that are moving at either a normalized speed (r), twice the normalized speed (2r), or three times the normalized speed (3r) in either the positive or negative direction along the x, y or z axis of the lattice (Groups 2, 4, and 7); three sets of eight represent particles that are moving at the normalized speed (r), twice the normalized speed (2r), or three times the normalized speed (3r) relative to all three of the x, y, z lattice axes (Groups 3, 8, and 10); twelve represent particles that are moving at twice the normalized speed (2r) relative to two of the x, y, z lattice axes (Group 6); twenty four represent particles that are moving at the normalized speed (r) and twice the normalized speed (2r) relative to two of the x, y, z lattice axes, and not moving relative to the remaining axis (Group 5); and twenty four represent particles that are moving at the normalized speed (r) relative to two of the x, y, z lattice axes and three times the normalized speed (3r) relative to the remaining axis (Group 9).

For the two-dimensional model 2D-2, of the 37 velocities, one represents particles that are not moving (Group 1); three sets of four velocities represent particles that are moving at either a normalized speed (r), twice the normalized speed (2r), or three times the normalized speed (3r) in either the positive or negative direction along either the x or y axis of the lattice (Groups 2, 4, and 7); two sets of four velocities represent particles that are moving at the normalized speed (r) or twice the normalized speed (2r) relative to both of the x and y lattice axes; eight velocities represent particles that are moving at the normalized speed (r) relative to one of the x and y lattice axes and twice the normalized speed (2r) relative to the other axis; and eight velocities represent particles that are moving at the normalized speed (r) relative to one of the x and y lattice axes and three times the normalized speed (3r) relative to the other axis.

The LBM models described above provide a specific class of efficient and robust discrete velocity kinetic models for numerical simulations of flows in both two- and three-dimensions. A model of this kind includes a particular set of discrete velocities and weights associated with those velocities. The velocities coincide with grid points of Cartesian coordinates in velocity space which facilitates accurate and efficient implementation of discrete velocity models, particularly the kind known as the lattice Boltzmann models. Using such models, flows can be simulated with high fidelity.

Figure 7:
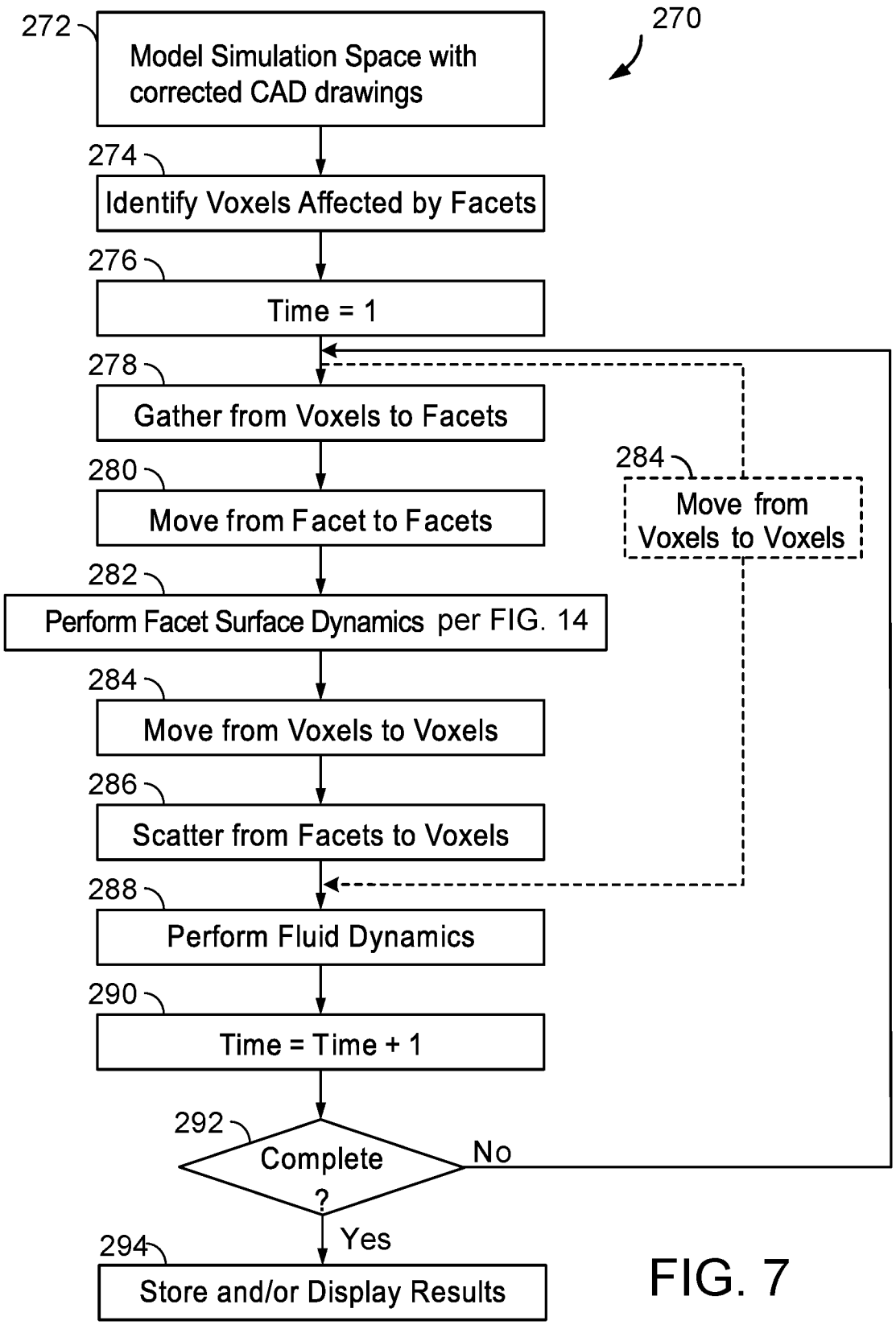
FIG. 7 is a flow chart of a procedure followed by a physical process simulation system using corrected CAD drawings.

Referring to FIG. 7, a physical process simulation system operates according to a procedure 270 to simulate a physical process such as fluid flow is described. Prior to the flow simulation, a simulation space is modeled (272) using CAD drawings as discussed above, as a collection of voxels. The simulation space is generated using a computer-aided-design (CAD) program and the gap correction processing of the CAD generated drawings. For example, a CAD program could be used to draw an air foil positioned in a wind tunnel.

The resolution of the lattice may be selected based on the Reynolds number of the system being simulated. The Reynolds number is related to the viscosity (v) of the flow, the characteristic length (L) of an object in the flow, and the characteristic velocity (u) of the flow:

$$Re=uL/v \qquad \text{Eq. (I.4)}$$

The characteristic length of an object represents large scale features of the object. For example, if flow around a micro-device were being simulated, the height of the micro-device might be considered to be the characteristic length. When flow around small regions of an object (e.g., the side mirror of an automobile) is of interest, the resolution of the simulation may be increased, or areas of increased resolution may be employed around the regions of interest. The dimensions of the voxels decrease as the resolution of the lattice increases.

The state space is represented as $f_i$ (x, t), where $f_i$ represents the number of elements, or particles, per unit volume in state i (i.e., the density of particles in state i) at a lattice site denoted by the three-dimensional vector x at a time t. For a known time increment, the number of particles is referred to simply as $f_i$ (x). The combination of all states of a lattice site is denoted as $f(x)$.

The number of states is determined by the number of possible velocity vectors within each energy level. The velocity vectors are integer linear speeds in a space having three dimensions: x, y, and z. The number of states is increased for multiple-species simulations.

Each state i represents a different velocity vector at a specific energy level (i.e., energy level zero, one or two). The velocity $c_i$ of each state is indicated with its "speed" in each of the three dimensions as follows:

$$c_i = (c_{ix}, c_{iy}, c_{iz}). \qquad \text{Eq.(I.5)}$$

The energy level zero state represents stopped particles that are not moving in any dimension, i.e., $c_{stopped} = (0, 0, 0)$. Energy level one states represents particles having a ±1 speed in one of the three dimensions and a zero speed in the other two dimensions. Energy level two states represent particles having either a ±1 speed in all three dimensions, or a ±2 speed in one of the three dimensions and a zero speed in the other two dimensions.

Generating all of the possible permutations of the three energy levels gives a total of 39 possible states (one energy zero state, 6 energy one states, 8 energy three states, 6 energy four states, 12 energy eight states and 6 energy nine states).

Each voxel (i.e., each lattice site) is represented by a state vector f(x). The state vector completely defines the status of the voxel and includes 39 entries. The 39 entries correspond to the one energy zero state, 6 energy one states, 8 energy three states, 6 energy four states, 12 energy eight states and 6 energy nine states. By using this velocity set, the system can produce Maxwell-Boltzmann statistics for an achieved equilibrium state vector.

For processing efficiency, the voxels are grouped in 2×2×2 volumes called microblocks. The microblocks are organized to permit parallel processing of the voxels and to minimize the overhead associated with the data structure. A short-hand notation for the voxels in the microblock is defined as $N_i$ (n), where n represents the relative position of the lattice site within the microblock and $n \in \{0, 1, 2, \ldots, 7\}$.

Figure 8:
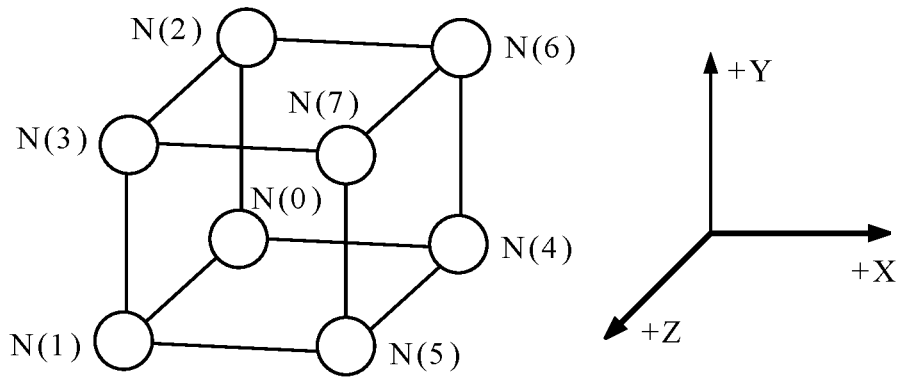
FIG. 8 is a perspective view of a microblock (prior art).

A microblock is illustrated in FIG. 8.

Figure 9A:
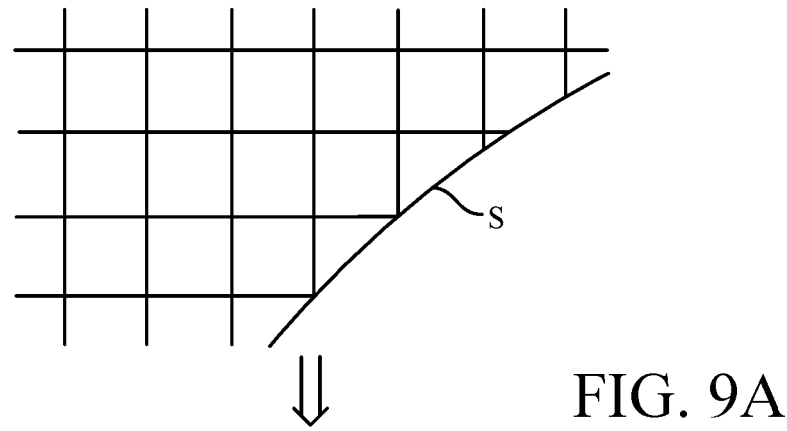
FIGS. 9A-9B are illustrations of lattice structures used by the system of FIG. 1 (prior art).
Figure 9B:
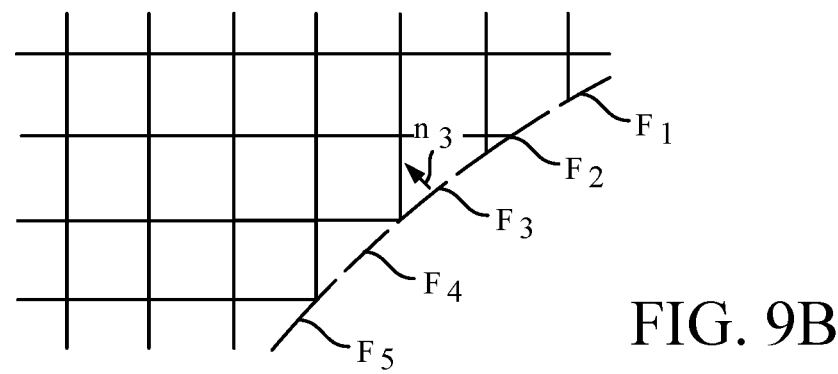

Referring to FIGS. 9A and 9B, a surface S (FIG. 9A) is represented in the simulation space (FIG. 9B) as a collection of facets $F_\alpha$:

$$S = \{F_\alpha\} \qquad \text{Eq.(I.6)}$$

where $\alpha$ is an index that enumerates a particular facet. A facet is not restricted to the voxel boundaries, but is typically sized on the order of or slightly smaller than the size of the voxels adjacent to the facet so that the facet affects a relatively small number of voxels. Properties are assigned to the facets for the purpose of implementing surface dynamics. In particular, each facet $F_\alpha$ has a unit normal $(n_\alpha)$, a surface area $(A_\alpha)$, a center location $(x_\alpha)$, and a facet distribution function $(f_i(\alpha))$ that describes the surface dynamic properties of the facet. The total energy distribution function $q_i(\alpha)$ is treated in the same way as the flow distribution for facet and voxel interaction.

Referring to FIG. 10, different levels of resolution may be used in different regions of the simulation space to improve processing efficiency. Typically, the region 320 around an object 322 is of the most interest and is therefore simulated with the highest resolution. Because the effect of viscosity decreases with distance from the object, decreasing levels of resolution (i.e., expanded voxel volumes) are employed to simulate regions 324, 326 that are spaced at increasing distances from the object 322.

Figure 11:
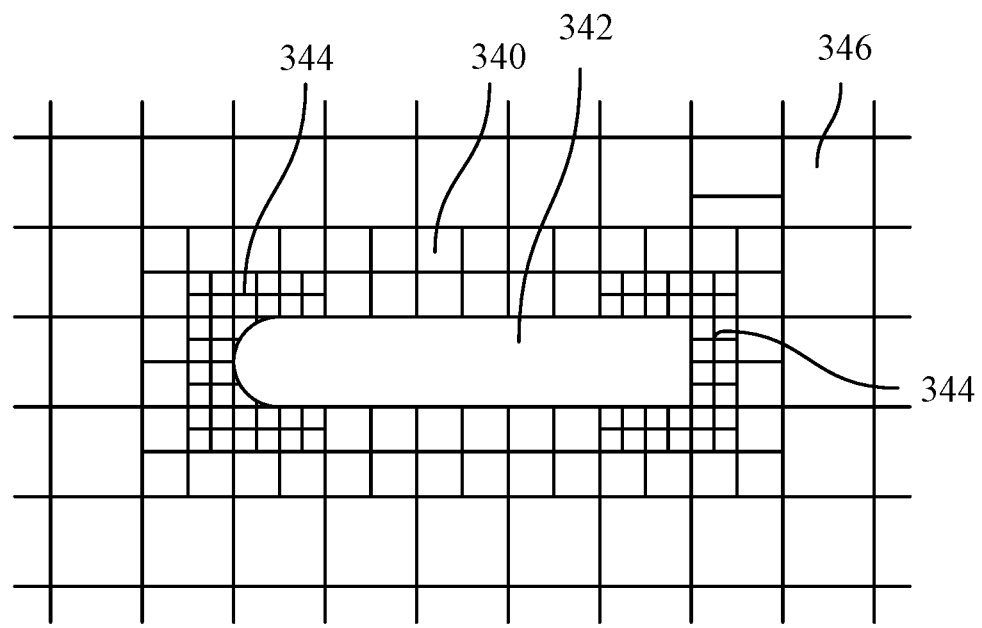

Similarly, as illustrated in FIG. 11, a lower level of resolution may be used to simulate a region 340 around less significant features of an object 342 while the highest level of resolution is used to simulate regions 344 around the most significant features (e.g., the leading and trailing surfaces) of the object 342. Outlying regions 346 are simulated using the lowest level of resolution and the largest voxels.

C. Identify Voxels Affected by Facets

Referring again to FIG. 11, once the simulation space has been modeled (272), voxels affected by one or more facets are identified (274). Voxels may be affected by facets in a number of ways. First, a voxel that is intersected by one or more facets is affected in that the voxel has a reduced volume relative to non-intersected voxels. This occurs because a facet, and material underlying the surface represented by the facet, occupies a portion of the voxel. A fractional factor $P_f(x)$ indicates the portion of the voxel that is unaffected by the facet (i.e., the portion that can be occupied by a fluid or other materials for which flow is being simulated). For non-intersected voxels, $P_f(x)$ equals one.

Voxels that interact with one or more facets by transferring particles to the facet or receiving particles from the facet are also identified as voxels affected by the facets. All voxels that are intersected by a facet will include at least one state that receives particles from the facet and at least one state that transfers particles to the facet. In most cases, additional voxels also will include such states.

Figure 12:
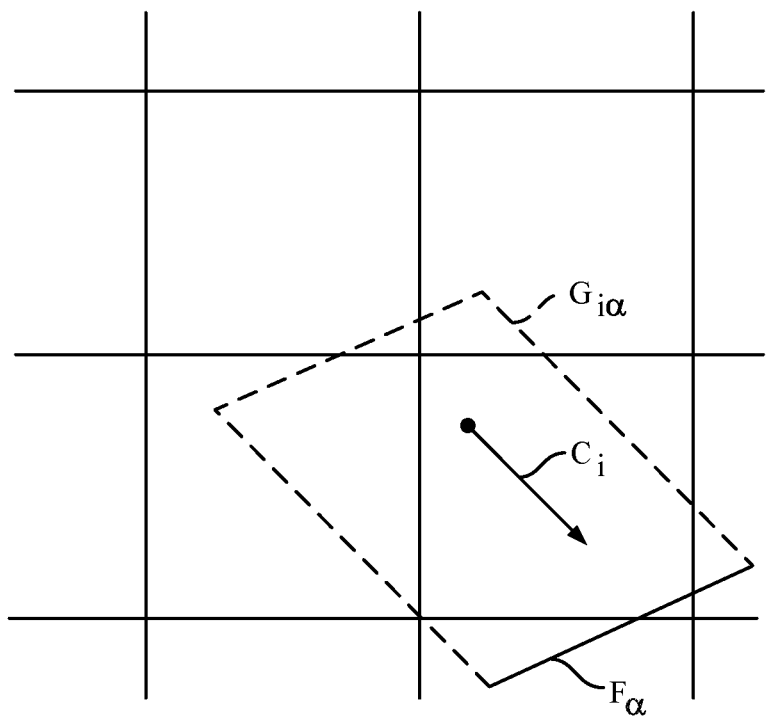
FIG. 12 illustrates movement of particles (prior art).

Referring to FIG. 12, for each state i having a non-zero velocity vector $c_i$, a facet $F_\alpha$ receives particles from, or transfers particles to, a region defined by a parallelepiped $G_{i\alpha}$ having a height defined by the magnitude of the vector dot product of the velocity vector $c_i$ and the unit normal $n_\alpha$ of the facet ($|c_i n_\alpha|$) and a base defined by the surface area $A_\alpha$ of the facet so that the volume $V_{i\alpha}$ of the parallelepiped $G_{i\alpha}$ equals:

$$V_{i\alpha} = |c_i n_\alpha| A_\alpha \qquad \text{Eq.(I.7)}$$

The facet $F_\alpha$ receives particles from the volume $V_{i\alpha}$ when the velocity vector of the state is directed toward the facet ($|c_i n_\alpha| < 0$), and transfers particles to the region when the velocity vector of the state is directed away from the facet ($|c_i n_\alpha| > 0$). As will be discussed below, this expression is modified when another facet occupies a portion of the parallelepiped $G_{i\alpha}$, a condition that could occur in the vicinity of non-convex features such as interior corners.

The parallelepiped $G_{i\alpha}$ of a facet $F_\alpha$ may overlap portions or all of multiple voxels. The number of voxels or portions thereof is dependent on the size of the facet relative to the size of the voxels, the energy of the state, and the orientation of the facet relative to the lattice structure. The number of affected voxels increases with the size of the facet. Accordingly, the size of the facet, as noted above, is typically selected to be on the order of or smaller than the size of the voxels located near the facet.

The portion of a voxel N(x) overlapped by a parallelepiped $G_{i\alpha}$ is defined as $V_{i\alpha}(x)$. Using this term, the flux $\Gamma_{i\alpha}(x)$ of state i particles that move between a voxel N(x) and a facet $F_\alpha$ equals the density of state i particles in the voxel ($N_i(x)$) multiplied by the volume of the region of overlap with the voxel ($V_{i\alpha}(x)$):

$$\Gamma_{i\alpha}(x)=N_i(x)V_{i\alpha}(x). \qquad \text{Eq.(I.8)}$$

When the parallelepiped $G_{i\alpha}$ is intersected by one or more facets, the following condition is true:

$$V_{i\alpha}=\Sigma V_{i\alpha}(x)+E\ V_{i\alpha}(\beta) \qquad \text{Eq.(I.9)}$$

where the first summation accounts for all voxels overlapped by $G_{i\alpha}$ and the second term accounts for all facets that intersect $G_{i\alpha}$. When the parallelepiped $G_{i\alpha}$ is not intersected by another facet, this expression reduces to:

$$V_{i\alpha}=\Sigma V_{i\alpha}(x). \qquad \text{Eq. (I.10)}$$

D. Perform Simulation

Once the voxels that are affected by one or more facets are identified (274), a timer is initialized to begin the simulation (276). During each time increment of the simulation, movement of particles from voxel to voxel is simulated by an advection stage (278-286) that accounts for interactions of the particles with surface facets. Next, a collision stage (288) simulates the interaction of particles within each voxel. Thereafter, the timer is incremented (290). If the incremented timer does not indicate that the simulation is complete (294), the advection and collision stages (278-200) are repeated. If the incremented timer indicates that the simulation is complete (202), results of the simulation are stored and/or displayed (204).

1. Boundary Conditions for Surface

To correctly simulate interactions with a surface, each facet meets four boundary conditions. First, the combined mass of particles received by a facet equal the combined mass of particles transferred by the facet (i.e., the net mass flux to the facet equals zero). Second, the combined energy of particles received by a facet equals the combined energy of particles transferred by the facet (i.e., the net energy flux to the facet equals zero). These two conditions may be satisfied by requiring the net mass flux at each energy level (i.e., energy levels one and two) to equal zero.

The other two boundary conditions are related to the net momentum of particles interacting with a facet. For a surface with no skin friction, referred to herein as a slip surface, the net tangential momentum flux equals zero and the net normal momentum flux equals the local pressure at the facet. Thus, the components of the combined received and transferred momentums that are perpendicular to the normal $n_\alpha$ of the facet (i.e., the tangential components) equals, while the difference between the components of the combined received and transferred momentums that are parallel to the normal $n_\alpha$ of the facet (i.e., the normal components) equals the local pressure at the facet. For non-slip surfaces, friction of the surface reduces the combined tangential momentum of particles transferred by the facet relative to the combined tangential momentum of particles received by the facet by a factor that is related to the amount of friction.

2. Gather from Voxels to Facets

Simulating interaction between particles and a surface, particles are gathered from the voxels and provided to the facets (278). As noted above, the flux of state i particles between a voxel N(x) and a facet $F_\alpha$ is:

$$\Gamma_{i\alpha}(x)=N_i(x)V_{i\alpha}(x). \qquad \text{Eq.(I.11)}$$

From this, for each state i directed toward a facet $F_\alpha$ ($c_i n_\alpha$<0), the number of particles provided to the facet $F_\alpha$ by the voxels is:

$$\Gamma_{i\alpha V \to F}=\Sigma_X \Gamma_{i\alpha}(x)=\Sigma_X N_i(x)V_{i\alpha}(x) \qquad \text{Eq.(I.12)}$$

Only voxels for which $V_{i\alpha}$ (x) has a non-zero value are summed. As noted above, the size of the facets is selected so that $V_{i\alpha}$ (x) has a non-zero value for only a small number of voxels. Because $V_{i\alpha}$ (x) and $P_f$ (x) may have non-integer values, $\Gamma_\alpha$ (x) is stored and processed as a real number.

3. Move from Facet to Facet

Next, particles are moved between facets (280). If the parallelepiped $G_{i\alpha}$ for an incoming state ($c_i n_\alpha$<0) of a facet $F_\alpha$ is intersected by another facet $F_\beta$, then a portion of the state i particles received by the facet $F_\alpha$ will come from the facet $F_\beta$. In particular, facet $F_\alpha$ will receive a portion of the state i particles produced by facet $F_\beta$ during the previous time increment. This relationship is illustrated in FIG. 15, where a portion 380 of the parallelepiped $G_{i\alpha}$ that is intersected by facet $F_\beta$ equals a portion 382 of the parallelepiped $G_{i\beta}$ that is intersected by facet $F_\alpha$. As noted above, the intersected portion is denoted as $V_{i\alpha}$ ($\beta$). Using this term, the flux of state i particles between a facet $F_\beta$ and a facet $F_\alpha$ may be described as:

$$\Gamma_{i\alpha}(\beta,t-1)=\Gamma_i(\beta)V_{i\alpha}(\beta)/V_{i\alpha} \qquad \text{Eq.(I.13)}$$

where $\Gamma_i$ ($\beta$,t-1) is a measure of the state i particles produced by the facet $F_\beta$ during the previous time increment. From this, for each state i directed toward a facet $F_\alpha$ ($c_i n_\alpha$<0), the number of particles provided to the facet $F_\alpha$ by the other facets is:

$$\Gamma_{i\alpha F \to F}=\Sigma_\beta \Gamma_{i\alpha}(\beta)=\Sigma_\beta \Gamma_i(\beta,t-1)V_{i\alpha}(\beta)/V_{i\alpha} \qquad \text{Eq. (I.14)}$$

and the total flux of state i particles into the facet is:

$$\Gamma_{iIN}(\alpha)=\Gamma_{i\alpha F \to F}+\Gamma_{i\alpha F \to F}=\Sigma_x N_i(x)V_{i\alpha}+\Sigma_\beta \Gamma_i(\beta,t-1)V_{i\alpha}(\beta)/V_{i\alpha} \qquad \text{Eq.(I.15)}$$

The state vector N($\alpha$) for the facet, also referred to as a facet distribution function, has M entries corresponding to the M entries of the voxel states vectors. M is the number of discrete lattice speeds. The input states of the facet distribution function N($\alpha$) are set equal to the flux of particles into those states divided by the volume $V_{i\alpha}$:

$$N_i(\alpha)=\Gamma_{iIN}(\alpha)/V_{i\alpha} \qquad \text{Eq. (I.16)}$$

for $c_i$ $n_\alpha$<0.

The facet distribution function is a simulation tool for generating the output flux from a facet, and is not necessarily representative of actual particles. To generate an accurate output flux, values are assigned to the other states of the distribution function. Outward states are populated using the technique described above for populating the inward states:

$$N_i(\alpha)=\Gamma_{iOTHER}(\alpha)/V_{i\alpha} \qquad \text{Eq.(I.17)}$$

for $c_i$ $n_\alpha \geq 0$, wherein $\Gamma_{iOTHER}$ ($\alpha$) is determined using the technique described above for generating $\Gamma_{iIN}$ ($\alpha$), but applying the technique to states ($c_i$ $n_\alpha \geq 0$) other than incoming states ($c_i$ $n_\alpha$<0)). In an alternative approach, $\Gamma_{iOTHER}$ ($\alpha$) may be generated using values of $\Gamma_{iOUT}$ ($\alpha$) from the previous time step so that:

$$\Gamma_{iOTHER}(\alpha,t)=\Gamma_{iOUT}(\alpha,t-1). \qquad \text{Eq.(I.18)}$$

For parallel states ($c_i n_\alpha$=0), both $V_{i\alpha}$ and $V_{i\alpha}(x)$ are zero. In the expression for $N_i$ ($\alpha$), $V_{i\alpha}$ (x) appears in the numerator (from the expression for $\Gamma_{iOTHER}$ ($\alpha$) and $V_{i\alpha}$ appears in the denominator (from the expression for $N_i$ ($\alpha$)). Accordingly, $N_i$ ($\alpha$) for parallel states is determined as the limit of $N_i(\alpha)$ as $V_{i\alpha}$ and $V_{i\alpha}(x)$ approach zero. The values of states having zero velocity (i.e., rest states and states (0, 0, 0, 2) and (0, 0, 0, −2)) are initialized at the beginning of the simulation based on initial conditions for temperature and pressure. These values are then adjusted over time.

4. Perform Facet Surface Dynamics

Next, surface dynamics are performed for each facet to satisfy the boundary conditions discussed above (282). A procedure 390 for performing surface dynamics for a facet is illustrated in FIG. 14.

The velocity and densities are sampled from the voxel to the facet $F_\alpha$, during 278. The velocity is then projected along the surface (i.e) $u \cdot \hat{n} = 0$. The Boltzmann Equilibrium distribution is computed 392 based on the sampled density and projected velocity, and the density and velocity are scaled to satisfy the constraints specified by Equation 6 and 10, respectively. The resulting density and velocity are then used to compute the new Boltzmann Equilibrium distribution (392). The difference between the incoming distribution and the new Boltzmann distribution (394) and the combined momentum of difference between all incoming states and its corresponding Boltzmann distribution (396) are computed as shown below.

$$\delta P(\alpha) = \sum_{i,(c_i \cdot \hat{n})<0} c_i (\Gamma_{iIN}(\alpha) - \Gamma_{iIN}^{eq}(\alpha)) \qquad \text{Eq. (I.19)}$$

The momentum difference is projected along the tangential direction of the facet (398).

$$h(\alpha) = \delta P(\alpha) - (\delta P(\alpha) \cdot \hat{n}) \hat{n} \qquad \text{Eq.(I.20)}$$

From above momentum difference and Boltzmann distribution, outgoing flux is computed to satisfy the perfect slip boundary condition (399), by satisfying zero tangential flux $P \cdot \hat{\tau} = 0$.

$$\Gamma_{iout}(\alpha) = \left[ \Gamma_{iout}^{eq}(\alpha) - \frac{2w_i}{T_0^2}(c_i \cdot \hat{n})(c_i \cdot h(\alpha)) \right] \qquad \text{Eq. (I.21)}$$

To account for skin friction and other factors, the outgoing flux distribution may be further refined to:

$$\Gamma_{iout}(\alpha) = \left[ \Gamma_{iout}^{eq}(\alpha) - \frac{2w_i}{T_0^2}(c_i \cdot \hat{n})(c_i \cdot h(\alpha)) \right] + + \qquad \text{Eq. (I.22)}$$
$$\frac{|u| C_f (c_i \cdot \hat{n})}{2T_0} [\Gamma_{iout}^{eq}(\alpha) - \Gamma_{iIN}^{eq}(\alpha)]$$

where $C_f$ is skin friction coefficient. More detailed description of applying skin friction and correction to different energy levels of lattice required for perfect mass and energy conservations are presented in '260 patent.

5. Move from Voxels to Voxels

Referring again to FIG. 7, particles are moved between voxels along the three-dimensional rectilinear lattice (284). This voxel to voxel movement is the only movement operation performed on voxels that do not interact with the facets (i.e., voxels that are not located near a surface). In typical simulations, voxels that are not located near enough to a surface to interact with the surface constitute a large majority of the voxels.

Each of the separate states represents particles moving along the lattice with integer speeds in each of the three dimensions: x, y, and z. The integer speeds include: 0, ±1, and ±2. The sign of the speed indicates the direction in which a particle is moving along the corresponding axis.

For voxels that do not interact with a surface, the move operation is computationally quite simple. The entire population of a state is moved from its current voxel to its destination voxel during every time increment. At the same time, the particles of the destination voxel are moved from that voxel to their own destination voxels. For example, an energy level 1 particle that is moving in the +x and +y direction (1, 0, 0) is moved from its current voxel to one that is +1 over in the x direction and 0 for other direction. The particle ends up at its destination voxel with the same state it had before the move (1,0,0). Interactions within the voxel will likely change the particle count for that state based on local interactions with other particles and surfaces. If not, the particle will continue to move along the lattice at the same speed and direction.

The move operation becomes slightly more complicated for voxels that interact with one or more surfaces. This can result in one or more fractional particles being transferred to a facet. Transfer of such fractional particles to a facet results in fractional particles remaining in the voxels. These fractional particles are transferred to a voxel occupied by the facet.

Figure 13:
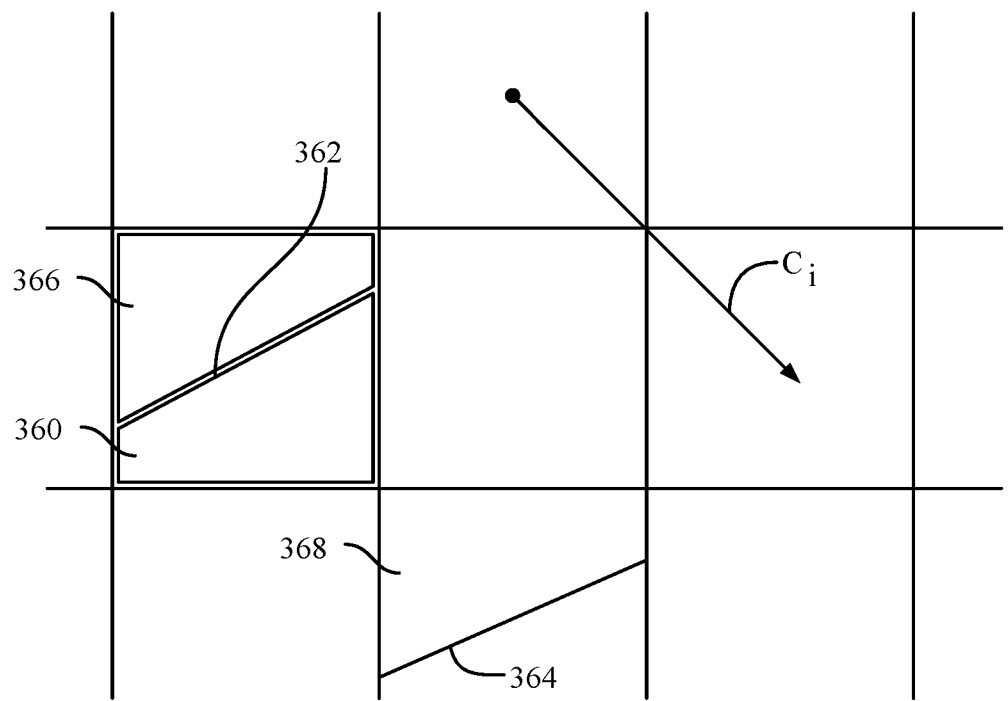
FIG. 13 illustrates regions affected by a facet of a surface (prior art).

Referring to FIG. 13, when a portion 360 of the state i particles for a voxel 362 is moved to a facet 364 (278), the remaining portion 366 is moved to a voxel 368 in which the facet 364 is located and from which particles of state i are directed to the facet 364. Thus, if the state population equaled 25 and $V_{i\alpha}(x)$ equaled 0.25 (i.e., a quarter of the voxel intersects the parallelepiped $G_{i\alpha}$), then 6.25 particles would be moved to the facet $F_\alpha$ and 18.75 particles would be moved to the voxel occupied by the facet $F_\alpha$. Because multiple facets could intersect a single voxel, the number of state i particles transferred to a voxel N(f) occupied by one or more facets is:

$$N_i(f) = N_i(x)\left(1 - \sum_\alpha V_{i\alpha}(x)\right) \qquad \text{Eq. (I.33)}$$

where N(x) is the source voxel.

6. Scatter from Facets to Voxels

Next, the outgoing particles from each facet are scattered to the voxels (286). Essentially, this scatter is the reverse of the gather by which particles were moved from the voxels to the facets. The number of state i particles that move from a facet $F_\alpha$ to a voxel N(x) is:

$$N_{\alpha i F \to V} = \frac{1}{P_f(x)} V_{i\alpha}(x) \Gamma_{\alpha i OUT_f} / V_{\alpha i} \qquad \text{Eq. (I.34)}$$

where $P_f(x)$ accounts for the volume reduction of partial voxels. From this, for each state i, the total number of particles directed from the facets to a voxel $N_{(x)}$ is:

$$N_{iF \to V} = \frac{1}{P_f(x)} \sum_\alpha V_{\alpha i}(x) \Gamma_{\alpha i OUT_f} / V_{\alpha i} \qquad \text{Eq. (I.35)}$$

After scattering particles from the facets to the voxels, combining them with particles that have advected in from surrounding voxels, and integerizing the result, it is possible that certain directions in certain voxels may either underflow (become negative) or overflow (exceed 255 in an eight-bit implementation). This would result in either a gain or loss in mass, momentum and energy after these quantities are truncated to fit in the allowed range of values. To protect against such occurrences, the mass, momentum and energy that are out of bounds are accumulated prior to truncation of the offending state. For the energy to which the state belongs, an amount of mass equal to the value gained (due to underflow) or lost (due to overflow) is added back to randomly (or sequentially) selected states having the same energy and that are not themselves subject to overflow or underflow. The additional momentum resulting from this addition of mass and energy is accumulated and added to the momentum from the truncation. By only adding mass to the same energy states, both mass and energy are corrected when the mass counter reaches zero. Finally, the momentum is corrected using pushing/pulling techniques until the momentum accumulator is returned to zero.

7. Perform Fluid Dynamics

Fluid dynamics are performed (288) FIG. 7. This may be referred to as microdynamics or intravoxel operations. Similarly, the advection procedure may be referred to as intervoxel operations. The microdynamics operations described below may also be used to collide particles at a facet to produce a Boltzmann distribution.

The fluid dynamics is ensured in the lattice Boltzmann equation models by a particular collision operator known as the BGK collision model. This collision model mimics the dynamics of the distribution in a real fluid system. The collision process can be well described by the right-hand side of Equation 1 and Equation 2. After the advection step, the conserved quantities of a fluid system, specifically the density, momentum and the energy are obtained from the distribution function using Equation 3. From these quantities, the equilibrium distribution function, noted by $f^{eq}$ in equation (2), is fully specified by Equation (4). The choice of the velocity vector set $c_i$, the weights, both are listed in Table 1, together with Equation 2 ensures that the macroscopic behavior obeys the correct hydrodynamic equation.

Variable Resolution

Variable resolution (as discussed in US 2013/0151221 A1) can also be employed and would use voxels of different sizes, e.g., coarse voxels and fine voxels.

Embodiments of the subject matter and the functional operations described in this specification can be implemented in digital electronic circuitry, tangibly-embodied computer software or firmware, computer hardware (including the structures disclosed in this specification and their structural equivalents), or in combinations of one or more of them. Embodiments of the subject matter described in this specification can be implemented as one or more computer programs (i.e., one or more modules of computer program instructions encoded on a tangible non-transitory program carrier for execution by, or to control the operation of, data processing apparatus). The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry (e.g., an FPGA (field programmable gate array) or an ASIC (application-specific integrated circuit)). In addition to hardware, the apparatus can optionally include code that produces an execution environment for computer programs (e.g., code that constitutes processor firmware, a protocol stack, a database management system, an operating system, or a combination of one or more of them).

A computer program, which can also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or another unit suitable for use in a computing environment. A computer program may, but need not, correspond to a file in a file system. A program can be stored in a portion of a file that holds other programs or data (e.g., one or more scripts stored in a markup language document, in a single file dedicated to the program in question, or in multiple coordinated files (e.g., files that store one or more modules, subprograms, or portions of code)). A computer program can be deployed so that the program is executed on one computer or on multiple computers that are located at one site or distributed across multiple sites and interconnected by a data communication network.

Computers suitable for the execution of a computer program can be based on general or special purpose microprocessors or both, or any other kind of central processing unit. Computer-readable media suitable for storing computer program instructions and data include all forms of non-volatile memory on media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

Embodiments of the subject matter described in this specification can be implemented in a computing system that includes a back-end component (e.g., as a data server), or that includes a middleware component (e.g., an application server), or that includes a front-end component (e.g., a client computer having a graphical user interface or a web browser through which a user can interact with an implementation of the subject matter described in this specification), or any combination of one or more such back-end, middleware, or front-end components. The components of the system can be interconnected by any form or medium of digital data communication (e.g., a communication network). Examples of communication networks include a local area network (LAN) and a wide area network (WAN) (e.g., the Internet).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user device (e.g., for purposes of displaying data to and receiving user input from a user interacting with the user device), which acts as a client. Data generated at the user device (e.g., a result of the user interaction) can be received from the user device at the server.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing can be advantageous.

What is claimed is:

1. A computer implemented method for simulating elements of a fluid flow about a representation of surfaces of a physical object, the method comprises:
storing in a memory state vectors for a plurality of voxels, the state vectors comprising a plurality of entries that correspond to particular momentum states of a plurality of possible momentum states at a voxel;
wherein an entry of a state vector represents a density of elements per unit volume in a particular momentum state of the voxel;
storing in a memory a representation of at least one surface of the physical object that is sized and oriented independently of the size and orientation of the voxels;
wherein the representation of the at least one surface comprises a plurality of facets, each facet of the plurality being assigned surface properties;
performing interaction operations on the state vectors, the interaction operations modelling interactions between elements of different momentum states;
performing surface interaction operations on the representation of the surface of the physical object, the surface interaction operations modelling interactions between the surface of the physical object and all elements of voxels, by:
sampling density from fluid flow near the surface; and
rescaling the density so that a zero mass flux condition is satisfied on the surface; and
performing move operations on the state vectors to reflect movement of elements to new voxels.

2. The method of claim 1 wherein the surface interaction operations comprises:
gathering elements from a first set of at least one voxel that interacts with a facet;
modelling interactions between the gathered elements and all facets to produce a set of surface interacted elements, and
scattering the surface interacted elements to a second set of at least one voxel that interacts with the facet.

3. The method of claim 1 further comprising:
sampling velocity from the fluid flow near the surface.

4. The method of claim 1 wherein a state vector comprises one or more of a plurality of integers and/or floating point values that represent a density of elements per unit volume in a particular momentum state and have more plural possible values.

5. The method of claim 1 wherein the surface interaction operations are performed using one or more of integer values and/or floating point values, and wherein the surface interaction operations are performed using values representative of real numbers.

6. The method of claim 1 wherein the surface interaction operations are performed using integer and/or floating point numbers.

7. The method of claim 1, further comprising:
representing a voxel that is intersected by a surface as a partial voxel.

8. The method of claim 1 wherein the representation of at least one surface comprises a plurality of facets that are sized and oriented independently of the size and orientation of the voxels, and represent at least one surface; and
model interactions between a facet and the elements of at least one voxel near the facet.

9. The method of claim 1 wherein the elements represent particles of a fluid and the facets represent at least one surface over which the fluid flows.

10. The method of claim 1 wherein performing surface interaction operations further comprises:
computing differences between incoming distribution and a Boltzmann distribution;
determining combined momentum from all state vector differences; and
generating outgoing distribution based on the determined differences.

11. A data processing system for simulating elements of a fluid flow about a representation of surfaces of a physical object, the data processing system comprises instructions for causing the data processing system to:
store in a memory state vectors for a plurality of voxels, the state vectors comprising a plurality of entries that correspond to particular momentum states of a plurality of possible momentum states at a voxel;
wherein an entry of a state vector represents a density of elements per unit volume in a particular momentum state of the voxel;
store in a memory a representation of at least one surface of the physical object that is sized and oriented independently of the size and orientation of the voxels;
wherein the representation of the at least one surface comprises a plurality of facets, each facet of the plurality being assigned surface properties;
perform interaction operations on the state vectors, the interaction operations modelling interactions between elements of different momentum states;
perform surface interaction operations on the representation of the surface, of the physical object, the surface interaction operations modelling interactions between the surface of the physical object and all elements of voxels, by:
sampling density from fluid flow near the surface; and
rescaling the density so that a zero mass flux condition is satisfied on the surface;
and
perform move operations on the state vectors to reflect movement of elements to new voxels.

12. The data processing system of claim 11 wherein the instructions to perform the surface interaction operations comprises instructions to:
gather elements from a first set of at least one voxel that interacts with a facet;
model interactions between the gathered elements and all facets to produce a set of surface interacted elements, and
scatter the surface interacted elements to a second set of at least one voxel that interacts with the facet.

13. The data processing system of claim 11 wherein a state vector comprises one or more of a plurality of integers and/or floating point values that represent a density of elements per unit volume in a particular momentum state and have more plural possible values.

14. The data processing system of claim 11 wherein the surface interaction operations are performed using one or more of integer values and/or floating point values, and wherein the surface interaction operations are performed using values representative of real numbers.

15. The data processing system of claim 11 wherein the surface interaction operations are performed using integer and/or floating point numbers.

16. The data processing system of claim 11 wherein the instructions to perform the surface interaction operations comprises instructions to:

represent a voxel that is intersected by a surface as a partial voxel.

17. The data processing system of claim 11 wherein the representation of at least one surface comprises a plurality of facets that are sized and oriented independently of the size and orientation of the voxels, and represent at least one surface; and the instructions further comprises instructions to:

model interactions between a facet and the elements of at least one voxel near the facet.

18. The data processing system of claim 11 wherein the elements represent particles of a fluid and the facets represent at least one surface over which the fluid flows.

19. The data processing system of claim 11 wherein the instructions to perform the surface interaction operations comprises instructions to:

compute differences between incoming distribution and a Boltzmann distribution;

determine combined momentum from all state vector differences; and generate outgoing distribution based on the determined differences.

20. A non-transitory computer readable medium tangible storing a computer program product, for simulating elements of a fluid flow about a representation of surfaces of a physical object, the computer program product comprises instructions to cause a data processing system to:

store in a memory state vectors for a plurality of voxels, the state vectors comprising a plurality of entries that correspond to particular momentum states of a plurality of possible momentum states at a voxel;

wherein an entry of a state vector represents a density of elements per unit volume in a particular momentum state of the voxel;

store in a memory a representation of at least one surface of the physical object that is sized and oriented independently of the size and orientation of the voxels;

perform interaction operations on the state vectors, the interaction operations modelling interactions between elements of different momentum states;

wherein the representation of the at least one surface comprises a plurality of facets, each facet of the plurality being assigned surface properties;

perform surface interaction operations on the representation of the surface of the physical object, the surface interaction operations modelling interactions between the surface of the physical object and all elements of voxels, by:

sampling density from fluid flow near the surface; and rescaling the density so that a zero mass flux condition is satisfied on the surface;

and perform move operations on the state vectors to reflect movement of elements to new voxels.

21. The computer readable medium of claim 20 wherein the surface interaction instructions further comprises instructions to:

gather elements from a first set of at least one voxel that interacts with a facet;

model interactions between the gathered elements and all facets to produce a set of surface interacted elements, and scatter the surface interacted elements to a second set of at least one voxel that interacts with the facet.

22. The computer readable medium of claim 20 wherein a state vector comprises one or more of a plurality of integers and/or floating point values that represent a density of elements per unit volume in a particular momentum state and have more plural possible values.

23. The computer readable medium of claim 20 wherein the surface interaction operations are performed using one or more of integer values and/or floating point values, and wherein the surface interaction operations are performed using values representative of real numbers.

24. The computer readable medium of claim 20 wherein performing surface interaction operations further comprises instructions to:

compute differences between incoming distribution and a Boltzmann distribution;

determine combined momentum from all state vector differences; and generate outgoing distribution based on the determined differences.

* * * * *